United States Patent [19]
Ulch et al.

[11] 4,218,690

[45] Aug. 19, 1980

[54] SELF-CONTAINED PROGRAMMABLE TERMINAL FOR SECURITY SYSTEMS

[75] Inventors: Bryan D. Ulch, Valencia; Donald P. Sturgis, Claremont; Robert J. Fox, Los Angeles, all of Calif.

[73] Assignee: A-T-O, Inc., Willoughby, Ohio

[21] Appl. No.: 874,283

[22] Filed: Feb. 1, 1978

[51] Int. Cl.$^{2}$ .................... H04Q 9/00; G06K 5/00; G08B 23/00

[52] U.S. Cl. ............................ 340/149 R; 340/652; 340/147 MD

[58] Field of Search ....... 340/147 R, 147 MD, 164 R, 340/149 R, 149 A, 152 R, 652

[56] References Cited

U.S. PATENT DOCUMENTS

| | | | |
|---|---|---|---|
| 3,781,805 | 12/1973 | O'Neal, Jr. | 340/149 R |
| 3,848,229 | 11/1974 | Perron et al. | 340/149 A |
| 3,859,634 | 1/1975 | Perron et al. | 340/149 A |
| 3,866,173 | 2/1975 | Moorman et al. | 340/149 R |
| 3,959,633 | 5/1976 | Lawrence et al. | 340/149 R |
| 4,025,760 | 5/1977 | Trenkamp | 340/149 A |
| 4,097,727 | 6/1978 | Ulch | 340/152 |

*Primary Examiner*—Donald J. Yusko

*Attorney, Agent, or Firm*—Knobbe, Martens, Olson, Hubbard & Bear

[57] ABSTRACT

A security system is disclosed which utilizes plural remote terminals for controlling access at plural locations throughout a secured area or building. Each of these remote terminals is capable of independent functioning, and includes a memory for storing plural independent identification numbers which define the personnel who will be granted access. These numbers stored in the terminal memories may be different from terminal to terminal, or may be uniform throughout the system, and may be the same as a list stored at a central processing location. Thus, access may be limited to the same group of individuals regardless of whether it is provided by a central memory list or a remote memory list. The remote memories provide total memory flexibility, so that the deletion of identification numbers from the list does not reduce the memory size. The memory, in addition to identification numbers, stores data defining real time access limitations for each of the individuals who will be granted access, so that flexibility in time of day access control is provided on a programmable basis.

8 Claims, 5 Drawing Figures

SELF-CONTAINED PROGRAMMABLE TERMINAL FOR SECURITY SYSTEMS

BACKGROUND OF THE INVENTION

This invention relates to security systems and, in the preferred embodiment, to magnetically encoded data card security systems in which access at a secured location is controlled by a comparison of data on a card inserted by personnel into the system with data stored in the system and defining those persons who shall be granted access. More particularly, this invention relates to a system in which, in addition to card data, keyboard data may be entered by persons wishing access, the keyboard data being a combination and permutation of the card data. In such a system, the present invention provides a substantially broader degree of flexibility in system control than was previously available, since it permits independent programming of terminals at each of plural remote locations in a system where the remote terminals, under normal circumstances, operate in conjunction with a central processor to regulate access. Thus, with this system flexibility, it is possible, even when communication is interrupted between the central processor and the remote terminals, to limit access at the remote terminals in accordance with either (a) the same identification list as is stored in the main memory, (b) a more stringent list, or (c) a more liberal list, as the user desires. Such flexibility has not heretofore been available. Furthermore, the ability to program a memory list to define who shall be provided access at each of the independent terminals, is accomplished in the present invention in a manner which permits identification numbers to be added and deleted from the system without affecting the system's memory capacity.

Security systems utilizing remote terminals to limit access at individual remote locations have, in the past, utilized static magnetic card readers at these remote locations for controlling access through electrically operable devices, such as doors, turnstiles, printers, etc. Prior art systems have been devised in which the remote card readers communicate with a central data processor or operate as stand-alone units.

The card or badge bearing encoded data used for controlling access is typically inserted into a slot of a reader which reads and decodes the data on the card. Advantageously, this data is encoded as a plurality of magnetically polarized spots in a sheet of magnetic material. Such encoded data normally includes an identification number or numbers identifying the card holder. During use, this number encoded by the card is compared with a number or numbers stored in the central computer terminal in multi-terminal systems using central processors or at the remote locations in totally stand-alone systems, all to ascertain whether the individual inserting the card is entitled to access to a building, room, parking lot, or the like.

In one prior art embodiment, the magnetically polarized spots are used to directly actuate a read relay or other moving switch mechanism located within the reader. In the state-of-the-art system, as is exemplified by U.S. Pat. No. 3,686,479 entitled "Static Reader System For Magnetic Cards", assigned to A-T-O, Inc., assignee of the present invention, electromagnetic solid state sensors are used. These sensors are disclosed and claimed in U.S. Pat. No. 3,717,749, also assigned to A-T-O, Inc. These patents are hereby incorporated in this disclosure by reference. Such systems have been found to be very reliable and are in use as access control systems in a number of different industries, universities, and government installations.

Operation of such systems as a part of a security network employing a central processor is disclosed and claimed in U.S. Pat. No. 4,004,134, also assigned to A-T-O, Inc., and also incorporated herein by reference. This latter system incorporates a central processor which periodically and sequentially polls each of the remote terminals in the system. The remote terminals are able to transfer data to the central processor only on receipt of a polling pulse. At the central terminal, data read at the remote location from an inserted card is compared with a master list which includes those persons who shall be given access at that remote location. Such systems, in the past, have permitted a limited degree of remote terminal operation, even if some or all of the interconnecting lines between the remote terminal and the central processor have been interrupted. The systems, however, generally require that a much simpler test be made of persons wishing entrance during such degraded mode operation, and thus the group of persons allowed access at such times is, of necessity, much larger than would normally be granted access. This is a distinct disadvantage in such systems, since it does not permit a controlled programmable access under all circumstances as is often required in secured locations.

An improved system for providing degraded operation in such a central processor-oriented system is disclosed and claimed in patent application Ser. No. 830,002, filed Sept. 1, 1977, entitled "Circuit For Controlling Automatic Off-Line Operation of An On-Line Card Reader", assigned to A-T-O, Inc., the assignee of the present invention, and incorporated herein by reference. Even in that improved system, there is no substantial system flexibility regarding the persons who will be granted access during degraded mode operation, and it is common in a system of that type to provide access during degraded mode operation to any person having a card coded for use within the overall security system, even if it is not coded for use at this particular remote location.

The communication lines used in a security system of this type, where a central processor is utilized for controlling the operation of plural remote terminals, provide an even greater level of security if the communication lines are monitored to assure that they are not tampered with and that their integrity is not degraded. A system for accomplishing this purpose is disclosed and claimed in U.S. patent application Ser. No. 827,994, filed Aug. 26, 1977, and entitled "System For Monitoring Integrity of Communication Lines In Security Systems Having Remote Terminals", this application being assigned to A-T-O, Inc., the assignee of the present invention and incorporated herein by reference.

It has also been known in the prior art to include at the remote location a keyboard. Typically such keyboard systems require that persons wishing access, in addition to the insertion of a magnetically encoded data card, are required to enter keyboard data, typically a sequence of digits. These digits have typically comprised a particular permutation and combination of the data encoded on the employee's card, the particular permutation and combination often being different for different remote terminals. Some prior systems have used hardwired permutation and combination circuits which did not permit alteration after the system was installed. A more advanced keyboard system, which permits programming of the particular permutation and combination after installation, is disclosed and claimed in U.S. patent application Ser. No. 830,004, filed Sept. 1, 1977, entitled "Remotely Programmable Keyboard Sequence For A Security System", assigned to A-T-O, Inc., the assignee of the present invention and incorporated herein by reference.

While these systems disclosed in the prior art have provided a relatively flexible, sophisticated security network, certain persistent problems have remained unsolved. One of these problems involves the fact that systems utilizing a central processor invariably provide very broadly based access during degraded communication line operation. In addition, the prior art systems in which remote terminals are used to store lists of identification numbers for selective access have permitted changes in the access lists only at the expense of reduced memory size since, in the prior art, the elimination of an identification number from a memory storage location has typically required the destruction of that memory location.

In addition, those prior art systems which utilized real-time clocks for limiting access through a particular terminal to different personnel at different times of day, have been fairly limited in their flexibility and typically required that a person be issued a new entrance card or badge if his time of entry was to be changed. Such systems, therefore, greatly reduced the flexibility of real-time access control. In addition, such systems have not provided plural overlapping time zones so that various personnel could be provided access at different times of day which were not mutually exclusive.

SUMMARY OF THE INVENTION

The present invention solves these persistent problems in the prior art and provides, through their solution, an extremely powerful and flexible terminal system for secured access control. This system includes independent programmable identification listings at each of the plural remote locations of those individuals who will be granted access at such locations. In addition, the system permits connection of a plurality of these remote terminals to a central processor which includes its own programmable memory listing of personnel who will be provided access at each of the remote locations. During normal operation, when a central processor is used, this central memory is used to provide access at each of the remote locations, since the use of a central processor permits a printer to be added to the system, which printer provides a record of personnel movement throughout the system on a continuous basis. The central processor system also permits programming of each of the remote units from a central location and thus makes the system easier to control and to operate.

Nevertheless, any difficulty in communication between the central processor and the remote terminals in this system will not degrade the system operation, since a complete list of personnel who will be provided access is stored in a programmable memory at the remote location. Thus, when faulty communication lines are detected, the system interrogates its own memory for access control, and the person inserting a card at the remote terminal has no way of determining that the communication lines are impaired.

Furthermore, the system of the present invention provides a flexible, solid state programmable memory which is operated in a manner which maintains identification numbers in numerical order within the memory. Such numerical ordering permits a binary search to be conducted so that an efficient determination can be made to determine whether a particular number is stored in the memory. When a number is deleted from the memory, the remaining entries in the memory are shifted to close the data order so that no voids remain. Thus, the end of the memory can always be checked to determine whether there is room for additional identification numbers.

It will be appreciated, of course, that since the terminals of the present invention have the capability of such stand-alone operation, they can be used in a totally stand-alone application where no central processor is provided. Even in such an application, these terminals permit total programming flexibility at each of the remote locations. It will be appreciated that, utilizing a terminal of this type, a mixed system, some terminals centrally controlled and some operated as stand-alone units, is permissible utilizing the same terminal throughout the system. In addition, it is possible to install a plurality of stand-alone terminals with the expectation that, at a later date as system requirements increase, a central processor may be added to control the already installed stand-alone remote terminals.

Whereas in the prior art systems which have time of day access control, a portion of a user's identification number typically included a time of day code, the present system utilizes such a time of day code only in combination with a user's identification number in memory. Thus, the user's card or badge does not itself define a time of day, and access at different remote locations may be provided using a single card at different times of day. In use, the present system responds to the insertion of a card by finding the user's identification number in memory and accessing an associated plurality of bits which determine the times of day at which access will be provided. If this defined time of day conforms with the time of day as monitored by real time clocks within the system, access will be provided. The time of day may be changed by changing each of plural clocks within the clock system itself. In addition, the particular clocks used for controlling access for each individual are programmable within the memory.

These and other advantages of the present invention are best understood through a reference to the drawings, in which.

DETAILED DESCRIPTION OF THE PREFERRED EMBODIMENT

Figure 1:
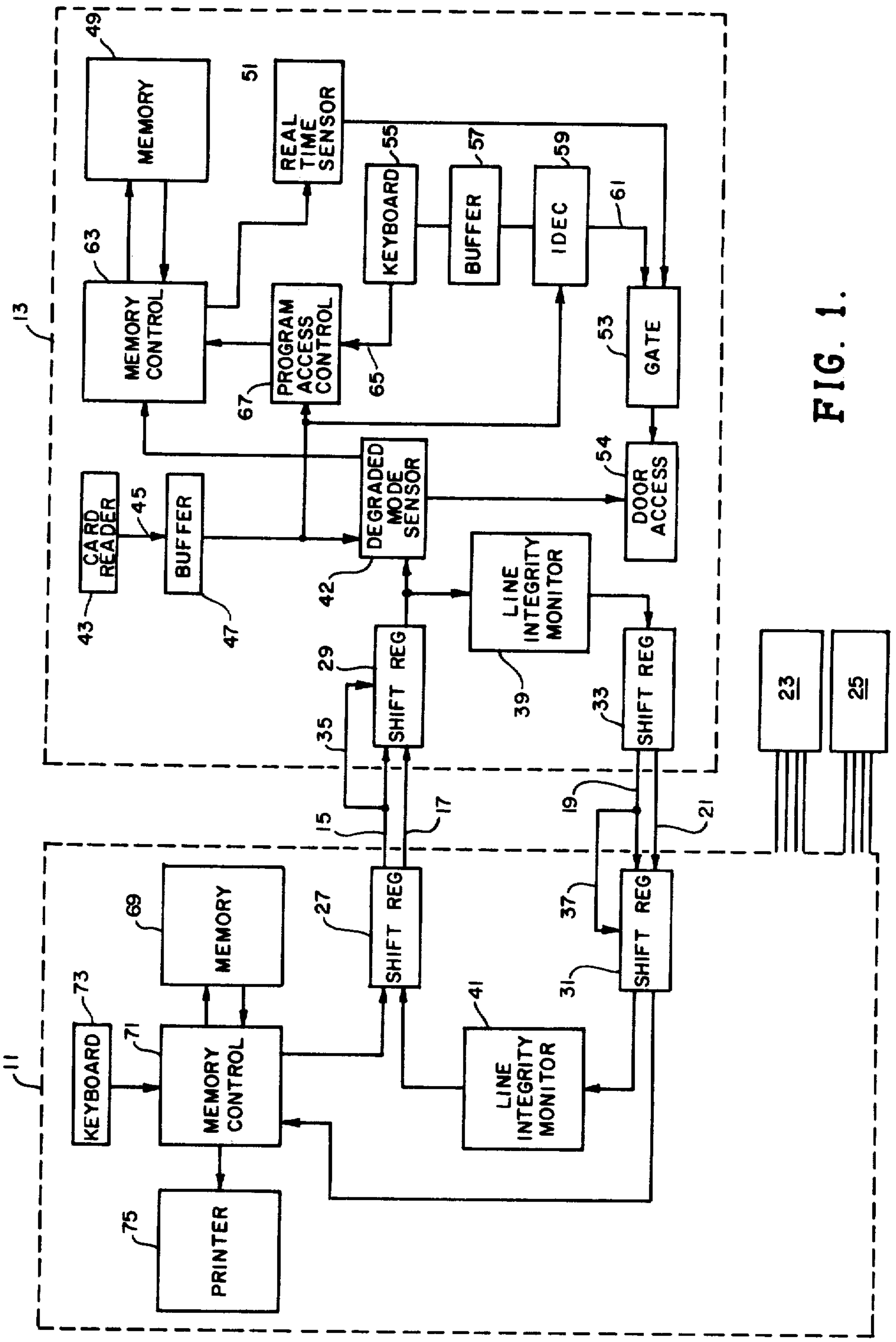
FIG. 1 is a schematic diagram of the overall system of the present invention showing the primary elements of a central processing unit and plural remote units.

Referring initially to FIG. 1, a central data processing unit 11 is shown connected to a particular remote terminal 13 by a pair of polling and data lines 15,17 and a pair of data lines 19 and 21. The polling lines 15 and 17, in a typical application, are unidirectional lines which enable the central data processing unit 11 to sequentially interrogate and send data to a plurality of remote terminals 13, 23, 25, etc. to determine which of these remote terminals require servicing. It will be understood throughout the remainder of the specification in this application that a large number of remote terminals may be connected to a single central processing unit 11 and that each of the remote terminals 23 and 25 performs substantially the functions described below with reference to the remote terminal 13.

It should be understood that the lines 15,17 are a line pair, the line 17, for example, providing a return for the line 15. Similarly, the line 21 provides a return for line 19. Polling signals and data which initiate at the central processor 11 are communicated to the remote terminal 13 on the line pair 15,17. Similarly, data signals produced at the remote terminal 13 are communicated to the central processor 11 on the line pair 19,21. It will be appreciated that words communicated on the line pairs 15,17 and 19,21 are most advantageously connected within the central and remote units 11,13 to shift registers 27–33. Thus, data sequentially clocked from register 27 onto lines 15,17 may be self-clocked, as shown by line 35 into shift register 29. Similarly, data sequentially clocked from the shift register 33 may be self-clocked, as shown by the connection 37, into the shift register 31.

Although the details of a line integrity monitoring system are not shown in FIG. 1 (in order to maintain the clarity of this disclosure), such a system is typically included in the communication system between the central processing unit 11 and the remote terminal 13, and is shown in FIG. 1 as a first line integrity monitor 39 within the remote terminal 13 interconnected between the shift registers 29 and 33, and a second line integrity monitor 41 in the central processing unit 11 interconnected between the shift register 31 and the shift register 27. The details of the line integrity monitoring circuits 39 and 41 are described in patent application Ser. No. 827,994, filed Aug. 26, 1977, mentioned previously. For the purpose of the present application, it is sufficient to understand that the line integrity monitoring system 41 causes the shift register 27 to sequentially poll the remote terminals 13,23,25, etc. by sending a polling signal on the lines 15 and 17. The remote terminals 13,23,25, etc., through the line integrity monitoring circuitry 39, respond to these polling signals by providing a calculated, predetermined response which is transmitted by way of the shift register 33 and data lines 19 and 21 to the shift register 31. This data returned from the remote terminal and placed in a shift register 31 is compared by the line integrity monitoring circuit 41 to determine whether an appropriate response has been received from the remote terminal and to thus verify the integrity of the lines 15,17,19,21. It will be understood by those skilled in this art that the continued integrity of these data and communication lines is extremely important, since systems built in accordance with the present invention are used to limit personnel access and the line integrity monitoring circuit 39,41 can provide an alarm, for example, at the central processor 11, whenever an intruder (or other cause) has interfered with the communication line network.

It is important to recognize at the outset of this disclosure that the remote terminal 13 is designed to operate as a stand-alone unit as well as a remote terminal for a central processor 11, and that it can therefore be utilized without the data communication lines 15 through 21, as described below.

A card reader or sensor 43, located in the remote terminal 13, substantially is described and claimed in U.S. Pat. Nos. 3,686,479 and 3,717,749, is used to sense magnetically encoded data on a card or badge inserted into the card reader 43. This data is transmitted, as by a line 45, to a buffer or storage register 47. In a typical system, the buffer 47 provides storage for five decimal digits, each of which can be any interger between zero and nine. The communication of these five digits requires four binary digits each, so that the interconnecting line 45, as well as the buffer 47, must be a 20-bit wide device. Data from the card inserted into the card reader 43 and supplying the 20 bits of information is typically placed into the register In the system of the present invention, this data will either be compared with data in a memory 49 (in the remote unit 13) to determine whether the five-digit identification number is present in the memory 49, or will be compared with data stored in the central processor 11, if it is connected. A degraded mode sensor 42 is typically connected in series between the buffer 47 and the memory 49 and is used to selectively send data from the buffer 47 via the shift register 33 to the central processor 11 or directly to the memory 49, depending upon the mode of operation of the terminal 13. If the terminal 13 is used as a stand-alone terminal, the degraded mode sensor 42 is bypassed so that the buffer 47 is linked directly to the memory system within the remote terminal. Alternatively, if the terminal 13 is used with a central processor, the degraded mode sensor 42 normally transmits data from the buffer 47 to the central processor unit via shift register 33 but can be used when the communication lines are degraded to transfer data from the buffer 47 directly to the memory 49 within the remote terminal. The degraded mode sensor may be substantially as described and claimed in patent application Ser. No. 830,002, filed Sept. 1, 1977, and referenced above.

If the memory 49 is being used, and stores an identification number identical to that in buffer 47, it will store, in conjunction with the number, a time code. This time code will be supplied by a memory control circuit 63, associated with the memory 49, to a real-time sensor circuit 51 which provides real-time input for the remote terminal 13. If the real-time input from the circuit 51 corresponds with the time data from the memory 49, the real-time circuit 51 will enable a gate 53 to provide access at the remote location, as through a door access control circuit 54.

In this system it is possible to provide, in addition to the memory 49, a secondary means for screening personnel for access. This mechanism includes a keyboard 55 attached to a buffer 57 and a circuit 59, referred to in FIG. 1 as an IDEC circuit. The IDEC circuit 59 is described in detail in patent application Ser. No. 830,004, filed Sept. 1, 1977 and referred to previously. For the purpose of the present application, it is sufficient to understand that the IDEC circuit 59 requires that the person requiring access at the door 54 must input a sequence of numbers at the keyboard 55, which is identical to a plurality of numbers read by the card reader 43, but altered in sequence. The IDEC circuit 59 responds to the data from the buffer 47 as well as the data from the buffer 57 to assure that the proper digits in the proper sequence are input at the keyboard 55. An output from the IDEC circuit 59 on line 61 is required at the gate 53, along with the output from the time of day circuit 51, in order to provide access at the door 54. It should be noted that the IDEC system 59 within the terminal 13 may be used regardless of whether the memory 49 or the central processor 11 memory is used for identification number comparisons.

It will be understood by those skilled in the art that the buffer 47 does not communicate directly with the memory 49, but rather is connected to a memory control 63 which accesses data to and from the memory 49, and organizes the data in memory. This memory control 63 is connected to the keyboard 55 for programming purposes, as shown by line 65, which is connected in series with a supervisor's access circuit 67. The supervisor's access circuit 67 is connected to the buffer 47 and assures that, unless a supervisor's card has been inserted in the card reader 43, the keyboard 55 cannot be used to change the identification numbers or time zones stored in the memory 49. Thus, the keyboard 55 is connected to the IDEC circuit 59 at all times, but is connected to the memory control circuit 63 only when a supervisor's card is used. The supervisor's access module 67 is described and claimed in patent application Ser. No. 827,993, filed Aug. 26, 1977, and referred to above. Although not shown in detail in FIG. 1, it will be understood from the description in that application that the circuit 67 compares data from the buffer 47 with a register to determine whether a supervisor's card has been inserted at the card reader 43, and permits access to the write logic incorporated in the memory control 63.

As has been common in the prior art, the central processor 11 may include a memory 69 and memory control 71 as well as a keyboard 73. Thus, the central processor, by monitoring data received from the remote unit 13 and placed in the shift register 31, may be used to grant or deny access through appropriate polling signals supplied from the memory 69 to the shift register 27. While the use, in general, of such a system at the central processor 11 forms a part of the present invention, the details are well known. Thus, the programming of the memory 69 utilizing the keyboard 73 and control 71 may be substantially identical to the programming described below for the memory 49 utilizing the memory control 63 and keyboard 55 at the remote unit. Furthermore, it should be understood that, using the techniques for programming which are described below, and well known communication techniques, it is possible through the communication lines 15–21 to interconnect the keyboard 73 with the memory control 63 in a standard fashion, so that the keyboard 73 may be used to program the memory 49 in one of the remote units 13.

It will also be understood that it is common at the central processor 11 to include a printer 73, typically connected to the memory control 71, for making a permanent record of access authorizations and denials at each of the remote units 13, so that the flow of personnel throughout the security system can be monitored.

Figure 2:
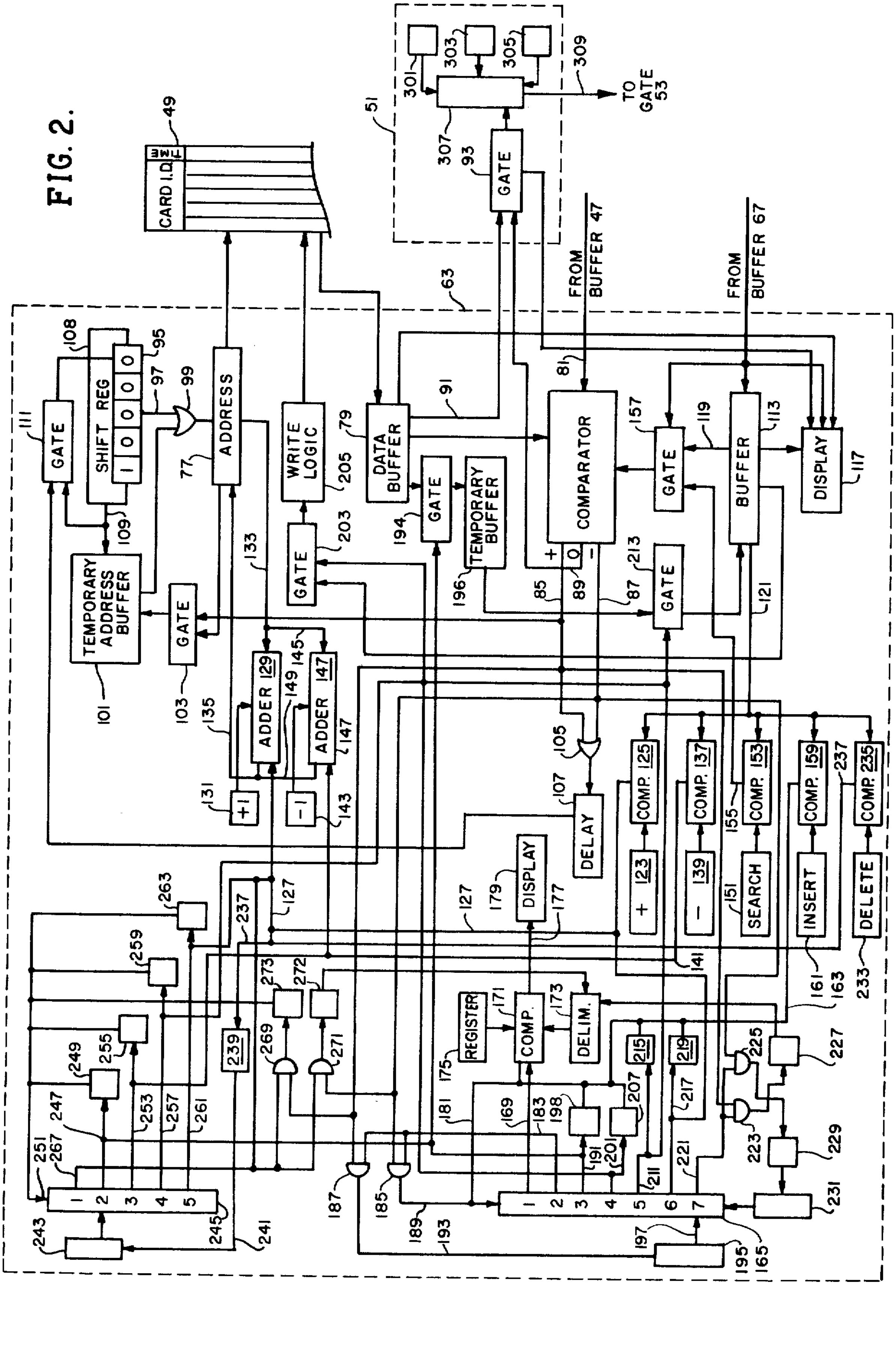
FIG. 2 is a more detailed schematic diagram showing the operation of the memory, memory control, and real-time sensor of the remote terminals of FIG. 1.

Referring to FIG. 2, the details of the memory 49, the memory control 63 as well as the real-time sensor 51 and its connections to the gate 53 and door access control 55, will be described.

The memory 49 is shown schematically in FIG. 2 to include five columns of card identification data digits and a single column of time code digits. The memory 49 stores in numerical sequence the five-digit identification numbers corresponding to the cards or badges of those personnel who are to be granted access at this remote terminal. Following each such identification number is a time code between 1 and 8 delineating the times of day when that particular individual is to be granted access. This time of day control will be understood in more detail through the description which follows.

The memory 49 is a read and write memory, or RAM memory, as is commonly used in digital circuits and is accessed by means of an address buffer 77 which forms a part of the memory control 63. A data buffer 79 is directly connected to the memory 49 and is used to access data from the memory 49 in accordance with the address 77. In the simplest utilization of the memory 49, data from the card reader buffer 47 is supplied on a line 81 to a comparator 83 which is also supplied with data from the data buffer 79. The comparator 83 is designed to provide a signal on a plus line 85 whenever the number accessed from the card reader buffer 47 is smaller than the data from buffer 79, to provide a signal on a minus line 87 whenever the data from the buffer 47 is larger than the data from the buffer 79 and to supply a signal on a zero line 89 when the data from the card reader buffer 47 is identical to the card identification data read from the data buffer 79. It will be understood that, since the time code data is not available from the buffer 47, only the card identification number portion, that is, the most-significant five digits, from the memory 49 is compared in the comparator 83. If the identification number from the buffer 47 is identical to the identification number accessed from the memory 49, indicating that the identification number from the card is present in the memory 49, a gate 93 is enabled to transfer the last four binary bits, conducted from the data buffer 79 on line 91, to the real-time sensor 51. This line 91 carries the decimal digit 1 through 8 which identifies the time code when access is to be permitted for this particular individual. The signal on line 89 enables the gate 93, indicating that the user's identification number is stored in memory.

It can be seen that the signal on line 89 is used to enable the gate 93 to access the time code data to the real-time sensor 51. Except on rare coincidences, the line 89 will not provide a signal, however, until a search for this identification number has been completed.

A search is accomplished as follows. In all cases, the address buffer 77 is initially accessed to the center location of the memory 49. This is accomplished by a shift register 95 which includes nine bit positions, eight of which are filled by consecutive zeroes and one of which is filled by a one. The binary 1 is in the most-significant bit position at the beginning of any data search. Thus, the binary number 1,0,0,0,0,0,0,0,0 is accessed on a line 97 from the shift register 95 and ORed in a gate 99 with a temporary address buffer 101 which, at the beginning of the search, stores the nine-digit binary number 0,0,0,0,0,0,0,0,0. This address is supplied to the address buffer 77 and selects the center position in the memory 49. In response to this accessing, the data buffer 79 is supplied with the center word in the memory 49, and this word is automatically compared with the identification number from the card data buffer 47. If the identification number, accessed at this central point from the memory 49, is smaller than the card identification number from the buffer 47, a signal will be produced on line 85 which will enable a gate 103 to supply the data from the address buffer 77 to the temporary address buffer 101. The temporary address buffer 101 in this instance will contain the word 1,0,0,0,0,0,0,0,0, designating the center location in memory 49. The signal on line 85 is also supplied through an OR gate 105 to a delay 107 which in turn clocks the shift register 95.

The shift register 95 is made recirculating by the connection 108, and the 1 in the most-significant bit position is thus clocked to the second most-significant bit position. If, on the other hand, the number accessed at the central location in the memory 49 is larger than the identification number from the buffer 47, a signal will be produced on line 87 which will recirculate (using gate 105 and delay 107) by one bit the shift register 95, but will not enable the gate 103. The number in the address buffer 77 will thus not be supplied to the temporary address buffer 101.

This searching routine continues so that each time that the comparator 83 produces a plus or minus output signal on line 85 or 87, the binary number in the shift register 95 is circulated by one count. The circulated number in this register 95 is ORed with the temporary address buffer 101, to change the address buffer 77 and thus address a new location in the memory. At the same time, the temporary address buffer is supplied with the additional digit from the shift register 95 only if the output from the comparator 83 indicates that the data is at a higher address location in the memory 49. Thus, the search continues, one bit at a time, in a normal binary search fashion. At each step, the next most-significant bit of the address buffer 77 is made a one if the data is at a higher address in the memory 49. Alternatively, the next most-significant bit of the address buffer 77 is made a zero if the data is at a lower address in the memory 49. This selective addressing is accomplished by either enabling or not enabling, respectively, the gate 103. Ultimately, this search process will locate the position in memory 49 at which the data from the buffer 47 should be stored, and if such data is stored in the memory 49, the data buffer 79 will store the same card identification number as is accessed on line 81, so that a zero signal will be produced on line 89 to gate the time code to the real-time sensor 51. Alternatively, if the search is completed, so that a binary one exists in the least-significant bit position of the shift register 97, this bit will be shifted on the last signal from the delay 107 to the most-significant bit position. As the one digit is thus shifted by the line 108, it is coupled by line 109 to temporarily disable a gate 111 which temporarily prohibits signals from the OR gate 105 from again actuating the shift register 95, and the search is thus terminated. This same signal on line 109 is used to clear the temporary address buffer 101.

If the search terminates without a zero signal being provided on line 89 from the comparator 83, no signals are produced which will enable the gate 93, and access will not be permitted to the card holder. Obviously, at any time during the search that a zero signal is produced, the search stops, since no signal is supplied to the OR gate 105, and access is immediately permitted if the time of day code compares favorably with the real time, as will be explained in more detail below.

The remainder of the circuitry associated with the memory control circuit 63 is utilized primarily for programming the memory 49 to add or delete identification numbers from the memory 49 or to search the memory 49 for programming purposes, so that the system user may provide access at this remote location for only selected personnel. As previously explained, a supervisor's card is utilized to provide program access, and this access supplies keyboard data from the program access control circuit 67 to a buffer 113, shown in FIG. 2. In a number of cases, the programmer will utilize the keyboard to place an identification number in the buffer 113, followed by a code indicating the operation to be conducted. Thus, for example, the programmer may place an identification number in the buffer 113 and utilize an additional keystroke to indicate that this identificationnumber is to be inserted into the memory, so that an additional employee will be granted access. Alternatively, the additional keystroke may be used to delete this number from memory or simply to search the memory for this member. In some cases, only a single keystroke is used, as, for example, when the programmer wishes to simply increment or decrement the memory address register 77.

Whenever signals are present on line 67 indicating that program access control has been granted, a line 115 coupled to line 67 enables a display 117, the first five digits of which, that is, the identification number digits of which, are provided by the buffer 113. The last digit, reserved for the time code digit from the memory 49, is supplied by the line 91 to the display 117. Thus, the programmer can see the identification number that the keys into the buffer 113, but his last keystroke which indicates the operation he wishes to perform, will not operate the display 117. Rather, the last keystroke will begin a search or other operation which will result in data being placed in the data buffer 79. Ultimately, the last digit of the display 117 will indicate the results of the search or other step by displaying the last digit from the data buffer 79.

The identification number from the buffer 113 is coupled by a line 119 to the comparator 83, while the least-significant bit is coupled by a line 121 to a plurality of comparators. If the least-significant keystroke identifies a memory address incrementing step, data identical to the keystroke is supplied by a buffer 123 so that a comparator 125 supplies a signal on line 127 to an adder 129 which adds unity from a register 131 to the current value of the address buffer 77, as supplied on line 133, and supplies the sum back to the address buffer 77 on line 135. Thus, each time that this keystroke is entered, the address in register 77 is incremented by one location, as required by the programmer. In a similar fashion, a decrementing keystroke will compare favorably in a comparator 137 with data from a buffer 139 to provide a signal on line 141 to add a minus one in a buffer 143 to the value in the address buffer 77, as accessed on line 145, so that an adder 147 provides on line 149 a decremented address, permitting the programmer to decrement the memory location address in register 77 for programming purposes.

If the programmer utilizes a keystroke which requires a search of the memory 69, after first introducing an identification number into the buffer 113, a search routine will be implemented which will search the memory 49 to determine whether the identification number in the buffer 113 exists in the memory 49 and, if so, during what time zones that individual is allowed access. This is accomplished by first comparing the keystroke data with a search keystroke indication in a buffer 151, so that a comparator 153 provides a signal on line 155 to enable a gate 157 which supplies the identification number from the buffer 113 to the comparator 83. The comparator 83 then initiates a search routine in a binary fashion, as previously described, to ultimately provide on lines 91 the decimal digit indicating the time access code for this particular identification number, which time access code will be displayed on the display 117 along with the identification number which was searched. If the identification number is not in the memory 49, a zero output signal on line 89 will not be produced by the comparator 83, and the gate 93 will not be enabled. Thus, no display will appear in the least-significant bit position of the display 117. Alternatively, the system could be designed to provide a zero in the least-significant bit position of the display 117 if the searched identification number is not present in the memory 49.

If, as the least-significant bit after the insertion of an identification number in the buffer 113, the programmer depresses a key which provides an instruction to insert this identification number as a new or additional identification number in the memory 49, a comparator 159 will provide an output signal because of identity between the keystroke data and data from a buffer 161, the signal being provided from the comparator 159 on line 163 to initiate the operation of a counter 165. This operation is initiated by placing the pulse on the clocking input 167 of the counter 165 so that the counter counts to its first position, placing an output signal on a 1 count line 169. When a signal is present on line 169, a comparator 171 compares a delimiter register 173 with a register 175 which stores a count equivalent to the last storage location in the memory 49. The delimiter register 173, as will be understood through the following description, is continuously updated so that it stores a number equal to the number of words stored in the memory 49. When the number in the delimiter register 173 is equal to the number stored in the register 175, this is an indication that the memory 49 is full and the comparator 171 will produce a signal on line 177 to energize a front panel display 179 indicating to the programmer that the memory is full, and that no additional identification numbers should be inserted without first deleting some identification numbers. Furthermore, the full memory indication is not connected to clock the counter 165, so the insert routine will not continue.

If the memory 49 is not full, the comparator 171 will produce a signal on line 181 indicating that the registers 173 and 175 did not store equal numbers. This signal on line 181 is used for clocking the counter 165 to its second count position, producing a signal on line 183. The programmer will have been told that, prior to an insert operation, a search operation should be conducted using the comparator 153 so that, at the time the insert operation is conducted, the address buffer 77 will be addressing the memory 49 at a location immediately preceding or immediately following the location where the new identification number should be inserted. At the end of the search routine, the comparator 83 will provide a plus signal on line 85 if the new data word should immediately precede the present location of the address buffer 77 or a minus signal if it should immediately follow this word. During the insert routine, the output lines of the comparator 83 are checked at the second clock position by ANDing the line 183 in gates 185 and 187 with the minus line 87 and plus line 85, respectively, from the comparator 83. If the minus line 87 contains a logic signal, the AND gate 185 produces an output signal on line 189 to again clock the counter 165 to produce an output signal on its 3-count line 191.

If, on the other hand, the plus line 85 is at a positive level, the AND gate 187 will provide a signal on line 193 to a buffer 195 enabling that buffer 195 to input on a plurality of lines 197 to the counter 165 a 6-count, so that the counter 165 will jump from its 2-count position to its 6-count position. This latter step is necessary so that if the new data word is to be stored at the next data position in memory 49 (a plus signal on line 85), a routine will be implemented which skips a data position in the memory 49. If, on the other hand, the present data position where the address buffer 77 presently points is not to be skipped (since the new data word is to go at this present position), the next series of steps between count 2 and count 6 of the counter 165 are used for removing and temporarily storing the presently addressed word from the memory 49, as will be seen from a description of these steps.

When the signal on line 189 clocks the counter 165 to its three count, the signal on line 191 enables a gate 194 so that data from the data buffer 79 is accessed in parallel to a temporary storage buffer 196. This step is used to save the identification number in the current memory location. It will be seen as this description follows that the current memory location is stored in the next lower memory location, while the word from that lower position is, in turn, stored in the next succeeding lower position. Thus, when a new word is placed in memory 49, the counter 165 is used to sequence a repeating routine which shifts the remaining data in the memory 49 toward the bottom of the memory 49 by one step, making room at the proper location in numerical order for the newly added data word.

Once the current identification number has been stored in the temporary register 196, a delay 198 connected to the line 191 is used to clock the counter 165 to its 4-count position. This 4-count position provides a signal on line 201 which enables a gate 203 connecting the buffer 113 to write logic 205 associated with the memory 49. Thus, at count 4, the data previously stored in the current memory location is automatically erased and the new identification number is written in this storage location. A delay circuit 207 connected to the line 201 is used to again clock the counter 165 at the completion of this writing operation so that the counter produces a 5-count output on line 211 which accesses the data word from the temporary buffer 196 into the buffer 113, erasing the number previously stored in the buffer 113, by enabling a gate 213 interconnecting these buffers. This places the number previously stored in the memory 49 (which was removed to make room for the new word) into the buffer 113, so that, on the next circulation of the counter 165, it can be written into the next successive location in the memory 49.

Figure 3:
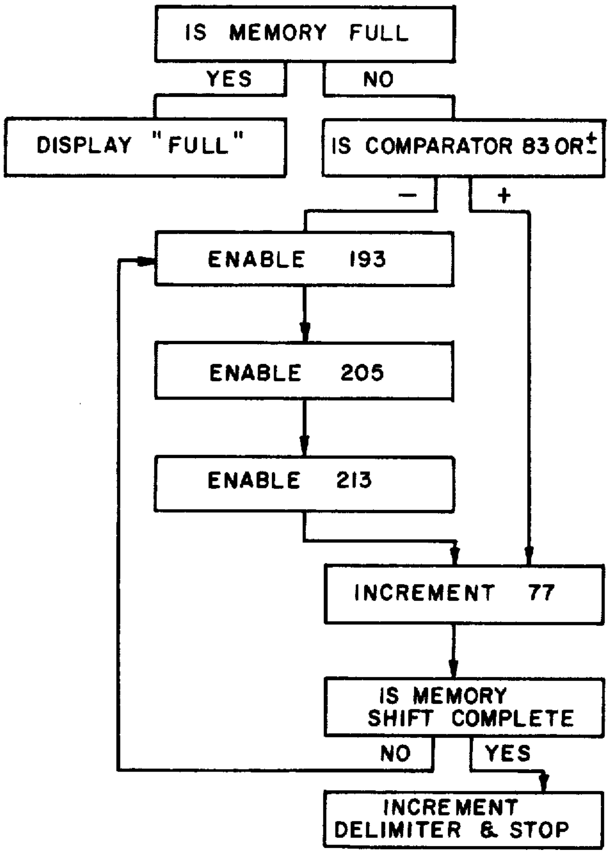
FIG. 3 is a flow chart showing the operation of an insertion loop counter and its associated electronic elements, all of which are shown in FIG. 2.

A delay 215 connected to line 211 clocks the counter 165 after the data has been accessed into the buffer 113 and the counter 165 then provides a 6-count output on line 217 which is connected to line 127 to increment the addressed location in the memory 49 as previously described. The line 217 is additionally connected through a delay 219 to clock the counter 165 to its seventh and final output position. It will be recognized that, at the sixth count position, the signal on line 217 incremented the memory 49 location so that the next successive memory word is being accessed. This memory word should be larger than the word currently in the buffer 113, unless we have reached the end of the data in the memory 49, in which case the new word would be 0,0,0,0 and thus smaller than the word stored presently in the buffer 113. Thus, the signals on lines 85 and 87 can be utilized to determine whether the insert routine should stop. The signal on line 221, indicating count 7, is ANDed with the signal on line 85 in AND gate 223 and with the signal on line 87 in AND gate 225. If the AND gate 223 produces an output signal, this signal is connected to an incrementing circuit 227 which is, in turn, connected to increment the delimiting register 173 adding one count to this register. If, on the other hand, the memory transfer operation has not been completed, the output signal from gate 225 will be used, through a delay 229, to clock the counter 165 back to its 3-count position by utilizing a 3-count register 231 to place a count of three in the counter 165. Thus, the sequence continuously loops through counts 3 through 7 until each of the words in the memory 49 has been shifted down one count, and the delimiter register 173 has been incremented. This entire insert routine is shown in the flow chart of FIG. 3. It can be seen from that fow chart that each element of memory data is shifted toward the end of the memory by one position to make room for the new element. The delimiter is then incremented and the process comes to a stop.

Figure 4:
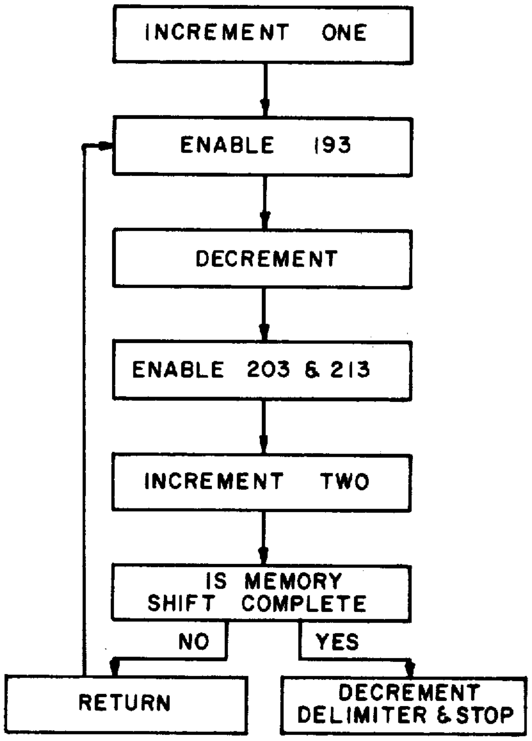
FIG. 4 is a flow chart showing the sequential operation of a deletion loop counter and its associated electronics, all as shown in FIG. 2.

A similar process is generated by a keyboard keystroke which provides on line 121 a delete signal which compares favorably with a delete word stored in a buffer 233. This sequence is shown in the flow chart of FIG. 4 and can be followed there as well as in the schematic diagram of FIG. 2. Signals from the comparator 235 connected to the buffer 233 indicate that a keystroke demanding a data element deletion from the memory 49 has been made. This signal on line 237 is used to provide the initial input to a counter 245 used to sequence the deletion process. During the data deletion process, it is desired to delete the element of data located during a search operation and to shift all of the remaining data within the memory 49 to close the gap. Thus, the remaining data in the memory 49 must be moved up in the memory by one data position, and the delimiter 173 must be decremented by one count.

This is accomplished by utilizing the signal on 237 to initially increment the address buffer 77 by providing a signal on line 127. A delay 239 is used to assure that this incrementing has been accomplished, and then provides a signal on line 241 to enable a buffer 243 storing a 2-count to input this 2-count into the counter 245 used for sequencing the deletion process. In response to the 2-count from the buffer 243, the counter 245 provides a 2-count output on line 247 which reads the data word at the incremented location into the temporary buffer 196 by enabling gate 194. In addition, through a delay 249, the signal 247 increments the counter 245 at its clocking input 251. The counter 245 then provides a 3-count output on line 253 which is connected to line 141 to decrement the address in the buffer 77. Line 253 is additionally connected through a delay 255 to clock the counter 245 to a 4-count position producing a signal on line 257. This signal is used to enable gates 213 and 203 to access the data from the temporary buffer 195 to the write logic 205. This logic 205 then writes the word in the temporary buffer 195 into the memory location addressed by the buffer 77 in the memory 49. The signal on line 257, in addition, provides a delayed output from a delay circuit 259 to clock the counter 245 to its 5-count position which provides a signal on line 261. Line 261 is connected to the line 127 to increment the address buffer 77. This signal is also delayed in a delay circuit 263 to provide an additional clocking input to the counter 245. In response to this additional clocking input, the counter 245 provide a 1 output on line 267 which is connected to line 127 to increment the address buffer 77 a second time, and is additionally ANDed in gates 269 and 271 with the plus signal 85 and minus signal 87. If a minus signal 87 is present, the end of search has been reached and the delimiter register is decremented by decrementer 272. If a plus signal is present, the gate 269 provides, through a delay 273, a clocking input to the counter 245 to repeat the data shifting process on the next data word. It can thus be seen that the counter 245 is used to sequence a repeating cycle of steps which are used as a looping function to shift all of the data words in the memory one step toward the beginning of the memory in order to close the gap in the memory which results from deleting a data word therefrom. The flow chart of FIG. 4 diagrams this process utilizing element numbers from the schematic of FIG. 2.

When, in the course of a searching operation, an identification number is located, it was explained previously that the data buffer 79 provides, through gate 93, a 4-bit output indicating the time of day when access is to be provided for the person having this identification number. This number is accessed by the real-time sensor 51 which, as shown in FIG. 2, includes three separate clocks, 301, 303, and 305, each of which can provide the closure of switch in response to a particular time of day setting. Thus, for example, the clock 301 may be set to provide a switch closure from 8:00 A.M. to 5:00 P.M., the clock 303 from 5:00 P.M. to midnight, and the clock 305 from midnight to 8:00 A.M. These three clock switches are accessed to a comparator 307 which is, in turn, provided with signals from the gate 93. If the signals from gate 93 conform to the switch closures from the clocks 301 through 305, access is permitted by placing a signal from the comparator 307 on line 309 to gate 53. In a typical arrangement, the comparator 307 will provide an output signal on line 309 if any one of the clock 301–305 is providing a switch closure and the signal from gate 93 has a 1-bit on the corresponding line indicating that this employee is to be provided access at the time of day indicated by this switch closure. It can be seen that by setting the clocks 301–305 and by giving a particular employee access at combinations of times from 1, 2, or 3 of these clocks, total flexibility in timing control can be achieved. Furthermore, by providing a time code on the fourth line from the gate 93, the comparator 307 can be made to provide an output signal on line 309 at any time of day, irrespective of the condition of the clocks 301 through 305, so that, for example, supervisory personnel can be granted access at all times.

Referring once again to FIG. 1, it bears repeating that the remote terminal 13 of the present invention will operate utilizing its own memory 49 and memory control 63 in the manner described. Alternatively, this same remote unit can be utilized by accessing data directly from the buffer 47 through the degraded mode sensor 42, shown in FIG. 1, and comparable so that described in patent application Ser. No. 830,002, filed Sept. 1, 1977, and referenced above. This degraded mode sensor 42 will limit access at this remote terminal in accordance with data stored in the memory 69 in the main processing unit 11 until such time as the communication lines are degraded. At that time, the memory 49 and its memory control 63 will be utilized for limiting access. It can be seen, therefore, that the terminal 13 of the present invention can be used either as a stand-alone terminal by bypassing the degraded mode sensor 42, or may be used as a remote terminal with a central processor system 11, utilizing the degraded mode sensor 42 to impose stand-alone operation only if data lines are degraded.

The present invention permits the same data to be stored in the memory 69 and the memory 49 so that, even during degraded mode operation, although one of the printer 75 may be lost (so that personnel flow data is no longer available), nevertheless the same limited number of personnel may be granted access at this remote location, so that security is not degraded.

Figure 5:
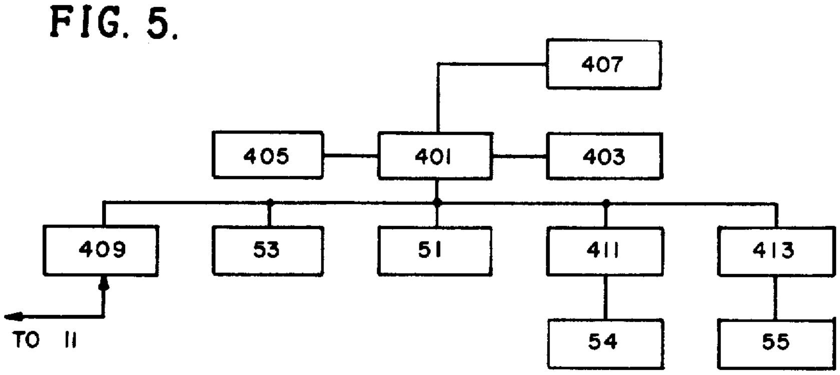
FIG. 5 is a schematic block diagram illustration of a programmable microprocessor system utilizing a program as included in this application for accomplishing the same basic functions provided by the hardwired embodiment of FIGS. 1-4.

The preceding embodiment described in reference to FIGS. 1 through 4 is illustrative of a hardwired circuit for performing the functions of the present invention. In the preferred embodiment, the functions of the remote units 13 are performed by a microprocessor, as illustrated in FIG. 5. This microprocessor includes a central processing unit 401, such as a Motorola 6800, which is connected with a memory unit 403, such as an AMI Model SF101. In addition, a scratch pad memory 405 can provided, such as a Motorola 6810. The central processing unit 401 is also connected to a read only memory 407 in a typical fashion to store the control steps for the central processing unit.

As is typical, the central processing unit 401 interfaces with a communication interface unit, such as a Motorola 6850, 409, for communicating with the central processor 11, and may interfere, in addition, with the card sensor 43 and real-time sensor 51, similar to those shown in FIG. 1. A peripheral interface adapter 411, such as a Motorola 6820, is used to connect the central processing unit 401 to the door access control 54, such as a door strike. The keyboard 55 of FIG. 1 may also be connected to the central processing unit 401 through the main data and control bus 413.

It will be recognized by those skilled in the art that the data processing unit, shown in FIG. 5, is typical of many other similar data processing units. What makes this processing unit unique is a program stored in the read-only memory 407 for controlling the operation of the central processing unit 401. This program, written for the Motorola 6800, is as follows:

```
        ; DELAY COUNTERS
        ;
        ;
        ; THESE TWO BYTE COUNTERS ARE INCREMENTED
        ; ON EVERY CLOCK TICK.  WHEN ONE OF THEM
        ; CLOCKS TO ZERO, THE ASSOCIATED COMPLETION
        ; ROUTINE IS CALLED.
        ;
        ; IF A COUNTER IS ZERO, IT STOPS
        ; THIS TABLE RUNS PARALLEL TO 'SERV'
        ;>>>>THE ORDER OF THE ENTRIES IS CRITICAL!!!
        ; E.G. ASCNTR MUST BE SIXTH BECAUSE OF THE CNTDN KLUDGE
        ;
     0000Z CNTRS    =      *
0000       CPCNTR:  BLOCK  2       ;(!) SET BY OPEN; WAKES GOON
0002       GOCNTR:  BLOCK  2       ;(!) SET BY GOON; WAKES GOOFF
0004       GXCNTR:  BLOCK  2       ;(!)SET BY GOON, GXOFF; WAKES
                    GXOFF
0006       ELCNTR:  BLOCK  2       ;SET BY COMCON;WAKES EDEND
0008       ERCNTR:  BLOCK  2
000A       ASCNTR:  BLOCK  2       ;(!)SET BY GOOFF; WAKES
                    RLYOFF(20)
```

```
0020          DUCNTR:    BLOCK   2
0022             BLOCK   2        ;FOR PATCHING
              ; NOTE:    (!) MEANS CLEARED BY NOTIME
              ;***
       0012   NCNTRS      =       *-CNTRS ;NUMBER OF **BYTES** OF
                         COUNTERS

              ;
              ;  STATE FLAGS
              ;
              ;
              ;  SOME BYTES TO INDICATE THE CURRENT MACHINE
              ;  STATE AND THE RESULTS OF PROCESSING A CARD
              ;  ENTRY.

              ;
0010          APBFLG:    BLOCK   1
0011          CRDFLG:    BLOCK   1
0012          EDMODE:    BLOCK   1        ;SET MEANS WE ARE EDITING
0013          OHFLG:     BLOCK   1        ;1 MEANS OPEN HOUSE
              ; KEYBOARD DATA TABLES
              ;

0014          KEYTAB:    BLOCK   5        ;IDFK OR EDIT INPUT
0019          KEYZON:    BLOCK   1        ;SIXTH EDIT DIGIT
001A          KEYPTR:    BLOCK   1        ;ALWAYS ZERO
001B          KEYCNT:    BLOCK   1
001C          DURESP:    BLOCK   1
001D          CMDBYT:    BLOCK   1        ;ZERO OR KEYBOARD CMD
001E          POISON:    BLOCK   1        ;WIPE OUT DISPLAY
              ;          ;ON NEXT NUMERIC KEY
001F          KEYFLG:    BLOCK   1        ;WEVE SEEN THIS KEY BEFORE
0020          OLDKEY:    BLOCK   1        ;FF OR LAST KEY SEEN
              ;
0021          MASTER:    BLOCK   4              ;CARD DIGIT INDICES
```

```
0225   MASHER:   BLOCK   4      ;"""" PUT UNPERMUTED
0229   MATCH:    BLOCK   1
       ;
       ; CARD DATA BUFFER
       ;
022A   DIGTAB:   BLOCK   8      ;DIGITS READ FROM CARD
0232   ENDMEM:   BLOCK   2      ;FIRST ADDR NOT IN CMOS MEMORY
0234   DISDIG:   BLOCK   3      ;SEARCH COMPARAND
0237   EDTPTR:   BLOCK   2      ;FIRST BYTE OF 'THIS' RECORD
0239   EDTZON:   BLOCK   1  ;TIME ZONE OF 'THIS' RECORD
       ;  ZERO MEANS EITHER POINTS TO INVALID RECORD
       ;  ERROR RETRIES IL AND COUNT
       ;
023A   RTIBUF:   BLOCK   5
023F   NTRIES:   BLOCK   1
       ;
       ;  XREG
       ;
       ;
       ;  SAVE AREAS FOR X BECAUSE YOU CAN'T
       ;  SAVE IT ANY OTHER WAY
       ;
0240   XREG0:    BLOCK   2
0242   XREG1:    BLOCK   2
0244   SCNPTR:   BLOCK   2
0246   DIGPTR:   BLOCK   2
0248   COMBX:    BLOCK   2
024A   MIXPTR:   BLOCK   2
024C   MUXPTR:   BLOCK   2      ;POINTS TO DIGIT TO BE
                 DISPLAYED
024E   MUXTMP:   BLOCK   1
       ;  EPROM AND I/O ADDRESSES
```

```
        0080  EPROM       =          $80
        0084  SCNTAB      =          $84       ;COIL ADDR TABLE
              ;
        00A4  BUFA        =          $A4       ;PIA COIL ADDRESSES
        00A5  CSRA        =          BUFA+1
        00A6  BUFB        =          BUFA+2    ;PIA RELAYS
        00A7  CSRB        =          BUFA+3
              ;
        00A8  ACSTAT      =          $00A8     ;ACIA STATUS PORT
        00A9  ACDATA      =          ACSTAT+1          ;ACIA I/O PORT
              ;
        00E0  ROW0        =          $00E0             ;KEYBOARD SWITCH ROW
              ; DIP SWITCH ADDRESSES
00C3              ASECT   $00C3
00C3          S.XXX:      BLOCK   1        ;EXTERNAL SENSOR SWITCHES
00C4          S.COMB:     BLOCK   1        ;PERMUTATION & COMBINATION
00C5          S.SYS:      BLOCK   1        ;SYSTEM CODE
        00C6  S.AS        =       *        ;AS/DOD TIMER COUNT
00C6          S.VTD:      BLOCK   1        ;VTD TIMER COUNT
              ; CMOS MEMORY ASSIGNMENTS
0000              VSECT
0000          SUM:        BLOCK   2        ;CHECKSUM OF REST OF CMOS
0002          FOX:        BLOCK   3        ;ID OF PERSON ALLOWED TO
                          EDIT MEMORY
0005          ENDPTR:     BLOCK   2        ;FIRST BYTE AFTER VALID
                          MEMORY
0007          CMOS:       BLOCK   3*5      ;ALLOW FIVE ENTRIES
        0016V END1        =       *        ;FIRST ADDR NOT IN CMOS
0016              BLOCK   3       ;AND ONE MORE
        0019V END2        =       *
0000              PSECT
              ; KLUDGEY LINKS TO FOREGROUND MODULE
```

```
0000          RTC:        BLOCK   3
0003          OPEN:       BLOCK   3
0006          BLANK:      BLOCK   3
0009          RIYON:      BLOCK   3
              ;
        0006  RUBOUT      =       BLANK
              ;
              ; RESET AND INTERRUPT VECTORS
              ;
0FF8             ASECT    $0FF8
0FF8             WORD     RTC     ;REAL TIME CLOCK
0FFA             WORD     $FC04   ;SWI TO KERNEL
       ;  BIT MASKS, ETC.
       ;
       ;************
       ;
       ; FIRST, THE OPTION BITS
       ; THESE SYMBOLS ARE USED TO REFER TO BITS IN
       ; THE OPTION BYTES
       ;
       ;** FIRST OPTION BYTE
0040   C.OH     =     $40    ;OPEN  HOUSE MODE
0020   C.AS     =     $20    ;ALARM SHUNT
0008   O.BIG    =     $08    ;LARGE CMOS MEMORY
0002   O.TZ     =     $02    ;TIME ZONE INPUTS
0001   O.IDEK   =     $01    ;WE ARE AN IDEK READER
       ;** NOW FOR THE SECOND BYTE OF OPTIONS
0040   C.ERAN   =     $40    ;ERROR ANNUNCIATOR
0020   C.DUR    =     $20    ;DURESS RELAY
       ;
       ; NOW FOR THE RELAY BITS
       ;
0080   R.GO     =     $80
```

```
0040  R.DUR     =      $40     ;DURESS RELAY
0020  R.AS      =      $20     ;ALARM SHUNT
0010  R.ERAN    =      $10     ;ERRAN
      ; NOW FOR THE EXTERNAL SWITCHES
      ; (THESE ARE BITS WITHIN THE WORD S.XXX)
      ;
0001  X.ICK     =      $01     ;CLOSED=ZERO=CARD ONLY
      ;X.TRIES  =      $06     ;NTRIES SWITCH INPUTS
0008  X.FOX     =      $08     ;STORE NEXT CARD AS FOX
      ;X.TZ     =      $70     ;TIME CLOCK INPUTS
0080  X.AS      =      $80     ;SHUNT REQUEST PUSHBUTTON
                   SWITCH

      ;
      ;
      ;  DELAY TIMES
      ;

      ;
      ;  THE COUNTER/TIMERS IN THE FOREGROUND ROUTINE
      ;  ARE CLOCKED ONCE EVERY 3.33
      ;  MILLISECONDS (300 TIMES A SECOND).
      ;  EACH COUNTER IS A TWO BYTE COUNTER, AND
      ;  IS INCREMENTED ON EACH CLOCK TICK.
      ;  TIMEOUT OCCURS WHEN COUNTER OVERFLOWS
      ;  TO ZERO.
      ;
      ;
FFF0  T.50MS    =      -16     ;50 MILLISECONDS
FED4  T.01S     =      -300    ;1 SECOND
FC7C  T.03S     =      -900    ;3 SECONDS
F448  T.10S     =      -3000   ;10 SECONDS
DCD8  T.30S     =      -9000   ;30 SECONDS
B9B0  T.60S     =      -18000  ;ONE MIN
```

```
                ;  BACK
                ;
                ;

                ;  THIS IS THE CONTROLLING PROGRAM FOR THE
                ;  BACKGROUND TASKS.  MOST OF THE EXECUTION
                ;  TIME OF THE PROCESSOR IS SPENT IN THIS
                ;  ROUTINE CHECKING STATUS BITS
                ;  AND WAITING TO BEGIN ONE OF SEVERAL
                ;  BACKGROUND TASKS.  THE FOLLOWING
                ;  TASKS ARE INITIATED FROM THIS ROUTINE:
                ;
                ;  1.  INITIATE RESPONSE TO CONSOLE INQUIRY
                ;  OR COMMAND.
                ;
                ;  2.  CHECK FOR CARD, OPEN DOOR IF OK
                ;
                ;  3.  CHECK FOR MASTER CARD, ACCEPT PROGRAMMING
                         COMMANDS

                 TITLE   "BACK"
2200             PSECT
                ;
2200 8E 0268 START:     LDS     #$0268          ;INIT STACK PTR
2203 BD 0197     JSR     IOSET   ;INITIALIZE I/O DEVICES
2212 BD 018C     JSR     CLRRAM  ;INITIALIZE MACHINE STATE
                ;
2215 CE FFFF     LDX     #$FFFF
0218 DF 80       STX     FPROM   ;ENABLE ALL FEATURES
                ; DETERMINE MEMORY SIZE

001A CE 001E     LDX     #END1
201D 96 80       LDAA    FPROM
201F 84 08       ANDA    #O.BIG
2021 27 03 =     BEQ     ENDMMS
```

```
2223 CE 0019     LDX      #END2
2226 DF 322  ENDMMS:     STX      ENDMEM
             ;
2228 BD 2401     JSR      CHKSUM  ;IS CMOS OK?
222B 27 29 =     BEQ      SUMOK
222D 7F 0024     CLR      FOX+2   ;WIPE OUT PART OF FOX
2230 BD 03AE     JSR      LOCLR   ;WIPE OUT REST OF CMOS
2233 BD 0412     JSR      SETSUM  ;SUM OK NOW!
      2236P SUMOK        =        *
             ;
2236             EION             ;TURN ON INTERRUPTS
             ; MAIN BACKGROUND LOOP
             ;
      2237P BACK         =        *

2237 86 34       LDAA     #$34
2239 97 A5       STAA     CSRA    ;WAKE UP DEADMAN
223B 96 112      LDAA     CRDFLG

223D 81 01       CMPA     #$01    ;NEW CARD?
223F 26 F6 =     BNE      BACK

             ; HERE WHEN WE GET A NEW CARD
2241 BD 01B6     JSR      CARDRD
2244 BD 02B5     JSR      PAKARD  ;CONDENSE INTO DISDIG
             ;
2247 BD 041C     JSR      CHKSYS
224A 26 4C =     BNE      ERROR   ;BAD SYS CODE
224C BD 042D     JSR      FRTL    ;SEE IF NEW PERSON TRYING
             ;
224F 96 C3       LDAA     S.XXX
2251 84 08       ANDA     #X.FOX  ;NEW MASTER?
2253 27 4C =     BEQ      NEWFOX  ;YES....DO NOT OPEN DOOR, THOUGH
             ; SEE IF WE SHOULD GO INTO EDIT MODE
2255 BD 0250     JSR      CHKFOX
```

```
2258 26 03 =     BNE      *+5
225A 7E 22F8     JMP      NEWED   ;YES, SIR!
          ; HERE IF ORDINARY ENTRY ATTEMPT
225D 86 34    BCK:        LDAA    #$34    ;KEEP DEADMAN FROM TRASHING US
225F 97 A5       STAA     CSRA
2261 96 112      LDAA     CRDFLG  ;LEAVE LOOP IF CARD REMOVED PREMATUREL

2263 27 D2 =     BEQ      BACK
2265 BD 22A1     JSR      CHKIDK  ;EXAMINE IDEK PASSWORD
2268 27 F3 =     BEQ      BCK     ;NOT READY YET
226A 25 2C =     BCS      ERROR   ;HE FLUBBED HIS PASSWORD!
          ;
226C 96 172      LDAA     OHFLG
226E 26 19 =     BNE      LETIN   ;TODAY IS OPEN HOUSE
          ;
2270 BD 0227     JSR      FIND            ;COMPARAND IN DISDIG ALREADY
          ; HERE WITH APPROPRIATE TZ IN EDTZON
2273 96 C3       LDAA     S.XXX   ;READ TIME ZONE INPUTS
2275 44          LSRA
2276 44          LSRA
2277 44          LSRA
2278 44          LSRA
2279 84 07       ANDA     #$07    ;TZ INPUTS IN 3 LSBS
227B 8A 08       ORAA     #$08            ;SUPER TIME ZONE ALWAYS ON
          ;
227D D6 82       LDAB     PROM
227F C4 22       ANDB     #O.TZ   ;DID HE PAY FOR TIME ZONES?

2281 27 2E =     BEQ      ERROR   ;NOT ALLOWED AT THIS TIME
          ; HERE AFTER WE HAVE RUN THE ENTIRE GAUNTLET
          ; ALL IS OK, LET HIM IN
2289 86 FE    LETIN:      LDAA    #$FE    ;MEANS CARD PROCESSED
228B 97 112      STAA     CRDFLG
228D BD 044A     JSR      DURESS
```

```
2Ø9Ø BD ØØ23    JSR     OPEN
ØØ93 7F ØØ3F    CLR     NTRIES
ØØ96 2Ø 9F =    BRA     BACK    ;GO WAIT FOR NEXT CARD
           ; HERE WHEN WE DECIDE THAT WE WILL NOT LET THIS GUY IN
      ØØ98P ERROR     =       *
ØØ98 86 FE      LDAA    #$FE    ;WERE THROUGH WITH THIS CARD
ØØ9A 97 11Z     STAA    CRDFLG
ØØ9C BD Ø2CE    JSR     ERRTRY  ;PULL IN ERRAN IF TOO MANY TRIES
ØØ9F 2Ø 96 =    BRA     BACK
           ;
           ; HERE WHEN THE NEW FOX CARD IS PUT IN
      ØØA1P NEWFOX    =       *
ØØA1 86 FE      LDAA    #$FE
ØØA3 97 11Z     STAA    CRDFLG  ;WE ARE THROUGH WITH THIS CARD
ØØA5 BD ØØ3B    JSR     SETFOX
ØØA8 BD Ø412    JSR     SETSUM  ;FIX UP CHECKSUM
ØØAB 2Ø 8A =    BRA     BACK
           ;
           ; ROUTINE TO CHECK IDEK PASSWORD
           ; RETURNS WITH Z SET IF NOTT READY
           ; RETURNS WITH C SET IF HE GOT IT WRONG
           ; BOTH CLEAR IF ALL OK
      ØØADP CHKIDK    =       *
ØØAD 96 8Ø      LDAA    PIROM
ØØAF 84 Ø1      ANDA    #O.IDEK
ØØB1 27 17 =    BEQ     HAPPY   ;NOT AN IDEK READER!
ØØB3 96 C3      LDAA    S.XXX
ØØB5 84 Ø1      ANDA    #X.ICK  ;CARD+ KEYBOARD?
ØØB7 27 11 =    BEQ     HAPPY   ;NO, CARD ONLY
           ;
ØØB9 96 1BZ     LDAA    KEYCNT
ØØBB 81 Ø4      CMPA    #$Ø4    ;THERE ARE 4 DIGS IN A PASSWORD
```

```
02BD 2B 09 =    BMI     NOIDEK  ;NOT ENUF YET
            ;
02BF BD 045F    JSR     COMBIN
02C2 25 06 =    BCS     HAPPY
            ; HERE IF BAD IDEK
02C4 86 01      LDAA    #1      ;NOT ZERO
02C6 0D         SEC
02C7 39         RTS
            ; HERE IF NOT READY
     02C8P NOIDEK   =       *
02C8 4F         CLRA
02C9 39         RTS
            ; HERE IF GOOD IDEK
     02CAP HAPPY    =       *
02CA 86 01      LDAA    #1
02CC 0C         CLC
02CD 39         RTS
            ; CALL HERE ONCE FOR EACH ERROR
            ; BUILDS IN ERRAN WHEN NTRIES IS USED UP
     02CEP ERRTRY   =       *
02CE 96 81      LDAA    ERROR+1
02D0 84 40      ANDA    #0.ERAN
02D2 27 1A =    BEQ     ETD             ;SAVE OURSELVES A LOT OF WORK
            ;
02D4 7C 003F    INC     NTRIES  ;KEEP COUNT
02D7 96 C3      LDAA    S.XXX   ;GET SWITCH SETTING
02D9 44         LSRA
02DA 84 03      ANDA    #$03
02DC 4C         INCA            ;ZERO ON SWITCHES=ONE TRY
02DD 91 3FZ     CMPA    NTRIES
02DF 26 0D =    BNE     ETD     ;STILL TRYING
            ;
02E1 86 12      LDAA    #S.ERAN
```

```
00E3 BD 0029     JSR      BIYON
00E6 7F 003F     CLR      NTRIES
00E9 CE FC7C     LDX      #T.03S
00EC DF 08Z      STX      ERCNTR
             ;
00EE 39       ETD:        RTS

             ; HERE WHEN THROUGH EDITING
      00EFP FINED        =        *
00EF 7F 0012     CLR      EDMODE
00F2 BD 0206     JSR      BLANK
00F5 7E 0037     JMP      BACK
             ;

             ;
             ; MAIN LOOP FOR EDITING MEMORY
             ;
      00F8P NEWED        =        *
00F8 86 FE       LDAA     #$FE
00FA 97 11Z      STAA     CRDFIG  ;HIS CARD IS FINISHED!
             ;
00FC 7C 0012     INC      EDMODE  ;WE ARE NOW EDITING
00FF BD 0182     JSR      EATCMD
0102 CE 0287     LDX      #CMCS
0105 DF 37Z      STX      EDTPTR
0107 CE B9B0     LDX      #T.60S
010A DF 26Z      STX      EDCNTR  ;TURN OFF IF IDLE ONE MIN
010C 7F 0039     CLR      EDTZON
             ;
      010FP EDIT         =        *
010F 86 34       LDAA     #$34
0111 97 A5       STAA     CSRA
0113 7D 0012     TST      EDMODE
0116 27 D7 =     BEQ      FINED   ;LEAVE EDIT MODE
```

```
0118 96 1D0      LDAA     CMDBYT
011A 2F F3 =     BLE      EDIT
011C BD 0129     JSR      COMCON
011F BD 0412     JSR      SETSUM
0122 CE 5950     LDX      #T.60S
0125 DF 060      STX      EDCNTR
0127 20 E6 =     BRA      EDIT

                 ; COMMAND DISPATCHER
                 ; CALL HERE WITH CMD CODE IN A
                 ;
        0129P COMCON     =          *
0129 7F 001D     CLR      CMDBYT   ;SO WE WON'T TRY TO DO IT AGAIN
012C 84 0F       ANDA     #$0F     ;STRIP OFF HIGH ORDER BITS
012E 81 0B       CMPA     #$0B     ;BIGGEST CMD IS 0A
0130 2A 3P =     BPL      COMRTS   ;ILLEGAL IGNORE
0132 48          ASLA              ;TWO BYTES TO AN ADDR
                 ; AT THIS POINT A CONTAINS 0000XXX0
0133 97 430      STAA     XREG1+1 ;LSB OFFSET
0135 86 ??       LDAA     #MSB COMTAB
0137 97 420      STAA     XREG1    ;MSB TABLE ADDR
0139 DE 420      LDX      XREG1
013B EE ??       LDX      CMTLSB,X          ;LSB TABLE ADDR
013D 6E 00       JMP      0,X
                 ;
        013FP COMTAB     =          *
013F             WORD     RUBOUT,UP,C.OH,CIRAIL
0147             WORD     DOWN,C.XOH,DELETE,SEARCH
014F             WORD     RUBOUT,QUIT,INSERT.,RUBOUT
        ????  CMTLSB     =          LSB COMTAB
                 ;
                 ; SERVICE ROUTINE FOR QUIT CMD
0157 7F 0012 QUIT:        CLR      EDMODE   ;BACKGROUND WILL NOTICE FLAG
015A 39          RTS
```

```
          ; SERVICE FOR OPEN HOUSE CMD
     015BP C.CH        =        *
015B 96 80      LDAA    EPROM
015D 84 40      ANDA    #C.CH
015F 27 21 =    BEQ     BADCMD
          ;
0161 BD 0006    JSR     BLANK
0164 86 01      LDAA    #$01
0166 97 13Z     STAA    OHFLG
0168 97 19Z     STAA    KEYZON  ;SHOW CMD ACCEPTED
016A 7C 001E    INC     POISON
016D 39     COMRTS:     RTS
          ;
          ; SERVICE FOR END OPEN HOUSE CMD
     016EP C.XCH       =        *
016E 96 80      LDAA    EPROM
0170 84 40      ANDA    #C.OH
0172 27 0E =    BEQ     BADCMD
          ;
0174 BD 0006    JSR     BLANK
0177 86 02      LDAA    #$02
0179 97 19Z     STAA    KEYZON
017B 7C 001E    INC     POISON
017E 7F 0013    CLR     OHFLG
          ; HERE TO RETRUN A CODE OF ZERO
0182 BD 0006 BADCMD:    JSR     BLANK
0185 7C 001E    INC     POISON
0188 7F 0019    CLR     KEYZON
018B 39         RTS
          ;
          ;
          ;  CLRRAM
```

```
          ;  CLEARS ALL RAM FROM 0020 TO VAREND
          ;  USED TO INIT RAM ON STARTUP
          ;
018C CE 004F CLRRAM:    LDX     #VAREND
018F 6F 00   CLRRML:    CLR     0,X
0191 09          DEX
0192 26 FB =     BNE     CLRRML
0194 6F 00       CLR     0,X     ;CLEAR BYTE ZERO ALSO!
0196 39          RTS
          ; I/O INITIALIZATION ROUTINES
          ;
          ;
0197 7F 00A5 IOSET:     CLR     CSRA    ;ROUTING BIT=0 MEANS DDRS
019A 7F 00A7     CLR     CSRB
019D 86 FF       LDAA    #$FF    ;1 MEANS OUTPUT
019F 97 A4       STAA    BUFA
01A1 86 FE       LDAA    #$FE            ;ONE INPUT FOR CARDIN
0
 1A3 97 A6       STAA    BUFB
          ; SET CA2 TO 'MANUAL', LOW=PG, HIGH=FG
          ;  (FOR DEADMAN)
          ; SET CA1 TO REACT TO FALLING EDGE OF COIL DATA
01A5 86 34       LDAA    #$34            ;$3C FOR FOREGROUND
01A7 97 A5       STAA    CSRA
          ; CB2 REACTS TO THE RISING EDGE OF RTC
          ; CB1 IS UNUSED
01A9 86 0E       LDAA    #$0E
01AB 97 A7       STAA    CSRB
          ; NOW SET INITAL VALUES
          ; NO COILS SELECTED, NO RELAYS ON
01AD 86 F0       LDAA    #$F0
01AF 97 A4       STAA    BUFA
01B1 86 0E       LDAA    #$0E
```

```
01B3 97 A6          STAA    BUFF
01B5 39       RTS2:         RTS

              ;*****************************************************
              ;
              ;             CARD READER
              ;
              ;*****************************************************
              ;
              ;
              ;  THIS SET OF ROUTINES READS THE MAGNETS,
              ; ASSEMBLES BITS INTO 4-BIT DIGITS
              ; AND STORES THEM ONE TO A WORD AT DIGTAB
              ;
              ;

01B6 CE 0064 CARDRD:    LDX     #SCNTAB ;POINTS AT COIL ADDRESSES
01B9 DF 44Z     STX     SCNPTR
01BB CE 002A    LDX     #DIGTAB
01BE DF 46Z     STX     DIGPTR  ;POINTS TO PLACE TO KEEP THE DIGITS
        01C0P CRDRD1    =       *
              ;
              ; HERE TO READ THE NEXT DIGIT OF THE CARD
              ;

              ;  LDX      DIGPTR
              ;           ;ASSUME X CONTAINS DIGPTR
01C0 8C 0031    CPX     #DIGTAB+7       ;STOP AFTER 7 DIGITS
01C3 26 01 =    BNE     CRDGIT
01C5 39         RTS                 ;ALL DIGITS ACCUMULATED
              ;
01C6 C6 10   CRDGIT:    LDAB    #$10            ;WILL CARRY AFTER
             4 ITERATIONS
     01C8P BITRD1     =       *
```

```
         ; HERE TO READ ONE BIT AND INCLUDE IT IN DIGIT
         ;
01C8 BD 01DA    JSR     CRDSCN  ;SCAN CARD FOR BIT
01CB 59         RCLB            ;ROLL CARRY BIT INTO B
01CC 7C 0045    INC     SCNPTR+1        ;UPDATE BIT INDEX LSB
01CF 24 F7 =    BCC     BITRDL  ;IF KLUDGEY FLAG BIT CARRIED OUT
         ; WE HAVE A DIGIT
         ; STORE IT IN RAM
         ;
01D1 DE 46Z     LDX     DIGPTR
01D3 E7 00      STAB    0,X
01D5 08         INX             ;UPDATE STROAGE POINTER
01D6 DF 46Z     STX     DIGPTR  ;SAFEKEEPING IN RAM
01D8 20 E6 =    BRA     CRIRDL  ;GO GET ANOTHER DIGIT
         ; CRDSCN:  CHECKS MAGNET BIT
         ;
         ; CALL WITH INDEX INTO COIL ADDR TABLE IN SCNPTR
         ; SETS CARRY BIT ACCORDING TO RESULT
         ;
01DA 86 F0   CRDSCN:   LDAA  #$F0            ;CLEAR COILS
01DC 97 A4      STAA  BUFA
01DE 01         NOP                ;WAIT FOR COILS TO SETTLE
01DF 01         NOP
01E0 01         NOP
01E1 96 A4      LDAA  BUFA              ;CLR PIA EDGE DETECTOR
01E3 DE 44Z     LDX     SCNPTR  ;PTR FOR THIS BIT
         ;
01E5 07         TPA                ;DISABLE INTERRUPTS DUE
01E6 36         PSHA               ;TO CRITICAL TIMING
01E7            PIOFF
         ;
01E8 A6 00      LDAA  0,X              ;GET COIL ADDRESS FROM PPROM
01EA 97 A4      STAA  BUFA              ;AND TURN ON COIL
```

```
01EC 01            NOP
01ED 01            NOP
01EE 01            NOP
01EF 01            NOP
01F0 01            NOP                   ;WAIT FOR COIL RESPONSE
01F1 01            NOP
01F2 01            NOP                   ;SET CARRY BIT ACCORDING TO
01F3 96 A5         LDAA   CSRA                 ;RESPONSE ON CRA7
01F5 2B 08 =       BMI     CRDSC
01F7 32            PULA                  ;RESTORE INTERRUPT STATUS
01F8 06            TAP
01F9 86 F0         LDAA    #$F0          ;TURN OFF COIL
01FB 97 A4         STAA    BUFA
01FD 0D            SEC                   ;NORTH SPOT--SET CARRY
01FE 39            RTS
               ;
01FF 32        CRDSC:      PULA                ;RESTORE INTERUPT STATUS
0200 06            TAP
0201 86 F0         LDAA    #$F0
0203 97 A4         STAA    BUFA
0205 0C            CLC                   ;SOUTH SPOT--CLR CARRY
               ;
0206 39            RTS

               ;  FIND
               ;
               ;  THE FIND ROUTINE SEARCHES THE TABLE OF IDS FOR THE ID
               ;  STORED IN DISDIG. IF THE ID IS FOUND IN THE TABLE THEN
               ;  THE TIME ZONE FOR THAT ID IS RETURNED IN
               ;  EDTZON. ALSO, THE VARIABLE  EDTPTR IS SET TO
               ;  POINT TO THE FIRST BYTE OF THE MATCHING ENTRY.
               ;  IF THE ID IS NOT FOUND THEN EDTZON IS SET TO
               ;  ZERO AND EDTPTR POINTS TO THE FIRST ENTRY LARGER
               ;  THAN THE ID. IF THE ID IS GREATER THAN ALL THE ENTRIES
```

```
             ;  IN THE TABLE THEN EDTPTR HAS THE VALUE ENDPTR.
             ;
2207 CE 0204 FIND:     LDX    #CMOS-3 ;ADDRESS OF TABLE - 3
             ;
220A BD 03DE DOENT:    JSR    INX3              ;NEXT ELEMENT OF TABLE
220D DF 37Z      STX   EDTPTR         ;MAYBE THIS IS THE ENTRY WE
                        SEEK
220F BC 0205     CPX   ENDPTR         ;END OF TABLE
2212 27 0D =     BEQ   NOTFOU         ;WELL COMPARAND NOT FOUND IN
                       TABLE
2214 BD 2225     JSR   COMDIG  ;COMPARE DISDIG AND TABLE ENTRY
2217 25 F1 =     BCS   DOENT   ;IF LOW THEN TRY NEXT ENTRY
2219 22 06 =     BHI   NOTFOU  ;WE HAVE GONE TOO FAR
             ;
221B A6 02       LDAA  2,X            ;GET THIRD BYTE OF ENTRY
221D 84 0F       ANDA  #$0F           ;LEAVE ONLY TIME ZONE
221F 20 01 =     BRA   RET
             ;
2221 4F      NOTFOU:   CLRA           ;ZERO TIME ZONE
             ;
2222 97 39Z  RET:      STAA  EDTZON  ;SAVE TIME ZONE
2224 39          RTS

             ;  COMDIG
             ;
             ;  COMDIG COMPARES THE ENTRY POINTED TO BY X
             ;  WITH THE ID STORED IN DISDIG. RETURNS CARRY SET
             ;  IF THE ENTRY IS SMALLER, ZERO SET IF THEY ARE
             ;  THE SAME.
             ;
2225 A6 00   COMDIG:   LDAA   0,X              ;GET FIRST BYTE OF
                  TABLE ENTRY
2227 91 34Z      CMPA  DISDIG  ;COMPARE TABLE BYTE AND ID BYTE
2229 26 0F =     BNE   RETCOM  ;RETURN IF NOT EQUAL
```

```
222B A6 01          LDAA    1,X       ;SECOND BYTE OF TABLE ENTRY
222D 91 35Z         CMPA    DISDIG+1          ;COMPARE SECOND BYTES
222F 26 09 =        BNE     RETCOM
                 ;
2231 A6 02          LDAA    2,X       ;THIRD BYTE
2233 84 F0          ANDA    #$F0      ;ZAP TIME ZONE FIELD
2235 D6 36Z         LDAB    DISDIG+2  ;GET THIRD BYTE OF DISDIG

2237 C4 F0          ANDB    #$F0      ;ZAP ITS TIME ZONE, TOO
2239 11             CBA
                 ;

223A 39          RETCOM:    RTS

                 ;  SETFOX
                 ;
                 ;  SETFOX SETS THE MASTER CARD. THE KEY IN DIGTAB
                 ;  IS STORED INTO THE LOCATION FOX.
                 ;
223B BD 22B5 SETFOX:        JSR       PAKARD  ;PACK DIGTAB INTO DISDIG
223E 96 34Z         LDAA    DISDIG    ;GET FIRST BYTE OF DISDIG
2240 B7 0002        STAA    FOX       ;PUT INTO FIRST BYTE OF FOX
2243 96 35Z         LDAA    DISDIG+1          ;SECOND DIGIT
2245 B7 0003        STAA    FOX+1
2248 96 36Z         LDAA    DISDIG+2
224A 8A 0F          ORAA    #$0F      ;PUT IN 'F' TIME ZONE
224C B7 0004        STAA    FOX+2
224F 39             RTS
                 ;
                 ;
                 ;  CHKFOX
                 ;
                 ;  CHKFOX CHECKS FOR THE MASTER CARD TO ALLOW
                 ;  EDITING OF THE TABLE OF IDS. RETURNS THE
                 ;  ZERO FLAG TRUE IF THE ID IN DIGTAB IS THE MASTER
```

```
              ; CARD, OTHERWIZE ZERO IS SET TO FALSE.
              ;
0250 BD 0285 CHKFCX:    JSR     PAKARD  ;PACK DIGITS INTO DISDIG
0253 CE 0002    LDX     #FCX
0256 BD 0225    JSR     CONDIG  ;CHECK IF DIGITS ARE THE SAME
0259 26 07 =    BNE     CHKRET  ;IF NOT RETURN
025B B6 0004    LDAA    FCX+2   ;GET THIRD DIGIT OF MASTER
025E 84 0F      ANDA    #$0F    ;LEAVE ONLY TIME ZONE
0260 81 0F      CMPA    #$0F    ;IS TIME ZONE 'F'
0262 39        CHKRET:  RTS
              ;
              ; SEARCH
              ;
              ; SEARCH SEARCHES FOR THE ID IN
              ; KEYTAB. IF THE ENTRY EXISTS THEN THE TIME ZONE
              ; IS PUT IN THE DISPLAY, OTHERWISE ZERO IS PUT IN THE
              ; TIME ZONE DISPLAY. EDTPTR POINTS TO THE ENTRY IF IT
              ; IS FOUND OTHERWISE IT POINTS TO THE FIRST LARGER ENTRY
              ; OR ENDPTR IF THERE IS NO LARGER ENTRY.
              ;
0263 7F 0019 SEARCH:    CLR     KEYZON  ;PREPARE FOR PACKING
0266 BD 0271    JSR     PKDIG   ;PACK KEYTAB INTO DISDIG
0269 BD 0227    JSR     FIND    ;FIND THE ENTRY
026C 96 39Z     LDAA    EDTZON  ;GET THE TIME ZONE(ZERO IF INVALID)
026E 97 19Z     STAA    KEYZON  ;DISPLAY TIME ZONE
0270 39         RTS

              ; PKDIG
              ;
              ; PKDIG PACKS THE DIGITS IN
              ; KEYTAB INTO DISDIG TWO DIGITS TO A BYTE.
              ;
0271 96 14Z  PKDIG:     LDAA    KEYTAB  ;GET FIRST BYTE OF KEYTAB
0273 BD 03E6    JSR     ASLA4   ;SHIFT DIGIT INTO LEFT HALF OF BYTE
```

```
0276 9A 15Z      ORAA   KEYTAB+1  ;OR SECOND DIGIT INTO RIGHT HALF
0278 97 34Z      STAA   DISDIG  ;STORE IT AS FIRST BYTE OF DISDIG
027A 96 16Z      LDAA   KEYTAB+2  ;THIRD DIGIT
027C BD 03E6     JSR    ASLA4
027F 9A 17Z      ORAA   KEYTAB+3  ;FOURTH DIGIT
0281 97 35Z      STAA   DISDIG+1  ;SECOND BYTE OF DISDIG
0283 96 18Z      LDAA   KEYTAB+4  ;FIFTH DIGIT
0285 BD 03E6     JSR    ASLA4
0288 9A 19Z      ORAA   KEYZON  ;TIME ZONE
028A 97 36Z      STAA   DISDIG+2
028C 39          RTS

                 ;  UPKDIG
                 ;
                 ;  UPKDIG UNPACKS THE DIGITS IN DISDIG INTO KEYTAB
                 ;  FOR DISPLAY.
                 ;
028D 96 34Z   UPKDIG:   LDAA   DISDIG  ;GET BYTE ONE OF DISDIG
028F BD 03EB     JSR    LSRA4  ;GET LEFT DIGIT INTO RIGHT HALF
0292 97 14Z      STAA   KEYTAB  ;FIRST BYTE OF KEYTAB
0294 96 34Z      LDAA   DISDIG  ;GET BYTE ONE AGAIN
0296 84 0F       ANDA   #$0F    ;MASK LEFT DIGIT
0298 97 15Z      STAA   KEYTAB+1 ;SECOND BYTE OF KEYTAB
029A 96 35Z      LDAA   DISDIG+1 ;BYTE TWO OF DISDIG
029C BD 03EB     JSR    LSRA4
029F 97 16Z      STAA   KEYTAB+2
02A1 96 35Z      LDAA   DISDIG+1
02A3 84 0F       ANDA   #$0F
02A5 97 17Z      STAA   KEYTAB+3
02A7 96 36Z      LDAA   DISDIG+2
02A9 BD 03EB     JSR    LSRA4
02AC 97 18Z      STAA   KEYTAB+4
02AE 96 36Z      LDAA   DISDIG+2
```

```
22P2 84 ØF          ANDA    #$ØF
22B2 97 19Z         STAA    KEYZCN  ;TIME ZONE
22B4 39             RTS
                ;   PAKARD
                ;
                ;   PAKARD PACKS THE DIGITS IN DIGTAB INTO DISDIG
                ;
22B5 96 2AZ  PAKARD:    LDAA    DIGTAB
2237 BD Ø3E6        JSR     ASLA4
22BA 9A 2BZ         ORAA    DIGTAB+1
22BC 97 34Z         STAA    DISDIG
22BE 96 2CZ         LDAA    DIGTAB+2
22C2 BD Ø3F6        JSR     ASLA4
22C3 9A 2DZ         ORAA    DIGTAB+3
22C5 97 35Z         STAA    DISDIG+1
22C7 96 2EZ         LDAA    DIGTAB+4
22C9 BD Ø3F6        JSR     ASLA4
22CC 97 36Z         STAA    DISDIG+2
22CE 39             RTS
                ;   DELETE
                ;
                ;   DELETE REMOVES THE ENTRY POINTED TO BY EDTPTR FROM THE
                ;   TABLE OF VALID IDS. ZAP TIME ZONE IN DISPLAY
                ;   ASSUME: #CMOS <= EDTPTR < ENDPTR
                ;
22CF 7D 2239 DELETE:    TST     EDTZCN  ;IS THIS ENTRY VALID
22D2 27 24 =        BEQ     NOENT
22D4 DE 37Z         LDX     EDTPTR  ;GET 'THIS' ENTRY
                ;
22D6 BC 2225 DELTOP:    CPX     ENDPTR  ;ARE WE PAST LAST ENTRY
22D9 27 11 =        BEQ     OUT             ;DONE
22DB A6 Ø3          LDAA    3,X             ;MOVE NEXT ENTRY ONTO THIS
```

```
                          ENTRY
22DD A7 02        STAA    3,X
22DF A6 04        LDAA    4,X
22E1 A7 01        STAA    1,X
22E3 A6 05        LDAA    5,X
22E5 A7 02        STAA    2,X
22E7 BD 03DE      JSR     INX3          ;ADD 3 TO X
22EA 20 EA =      BRA     DELTOP        ;MOVE NEXT ENTRY
                ;
22EC BD 03E2 OUT:         JSR     DEX3          ;DECREMENT X BY 3
22EF FF 2005      STX     ENDPTR ;ENDPTR = ENDPTR - 3
22F2 7F 0039      CLR     EDTZON ;CURRENT ENTRY IS NOT VALID
22F5 7F 0019      CLR     KEYZON ;ZAP TIME ZONE IN DISPLAY
22F8 39         NOENT:  RTS

                ;  INSERT
                ;
                ;  INSERT INSERTS THE ID AND TIME ZONE IN KEYTAB
                ;  INTO THE TABLE.
                ;
                INSERT.:
22F9 CE 0005      LDX     #5     ;5 ITERATIONS
                ;
22FC A6 13Z     INSNXT:   LDAA    KEYTAB-1,X      ;GET DIGIT OF KEYTAB
22FE 81 09        CMPA    #$09          ;CHK FOR GREATER THAN 9
2300 22 62 =      BHI     INSFAI ;ILLEGAL DIGIT GO AWAY
2302 09           DEX
2303 26 F7 =      BNE     INSNXT
                ;
2305 96 19Z       LDAA    KEYZON ;GET TIME ZONE
2307 81 08        CMPA    #$08          ;ILLEGAL?
2309 22 59 =      BHI     INSFAI ;GO AWAY
230B 7D 0019      TST     KEYZON ;ILLEGAL TIME ZONE
230E 27 54 =      BEQ     INSFAI ;IF SO GO AWAY
```

```
Ø31Ø BD Ø271     JSR     PKDIG  ;PACK KEYTAB INTO DISDIG
Ø313 BD Ø2Ø7     JSR     FIND    ;SEE IF ENTRY IN TABLE
Ø316 7D ØØ39     TST     EDTZON ;CHECK ZONE
Ø319 26 25 =     BNE     HAVSPA ;ITS ALREADY THERE
Ø31B FE ØØØ5     LDX     ENDPTR  ;GET POINTER TO PAST LAST ENTRY
Ø31E 9C 32Z      CPX     ENDMEM  ;ARE WE PAST END OF MEMORY
Ø32Ø 27 38 =     BEQ     OVERFL
Ø322 9C 37Z  INSTOP:     CPX     EDTPTR  ;ARE WE UP TO CURRENT ENTRY
Ø324 27 11 =     BEQ     OUT1
Ø326 BD Ø3E2     JSR     DEX3    ;DECREMENT X BY 3
Ø329 A6 ØØ       LDAA    Ø,X     ;MOVE THIS ENTRY DOWN BY ONE
Ø32B A7 Ø3       STAA    3,X
Ø32D A6 Ø1       LDAA    1,X
Ø32F A7 Ø4       STAA    4,X
Ø331 A6 Ø2       LDAA    2,X
Ø333 A7 Ø5       STAA    5,X
Ø335 2Ø EB =     BRA     INSTOP  ;MOVE NEXT ENTRY
              ;
Ø337 FE ØØØ5 OUT1:       LDX     ENDPTR  ;INCREMENT ENDPTR BY 3

Ø33A BD Ø3DE     JSR     INX3
Ø33D FF ØØØ5     STX     ENDPTR
Ø34Ø BD Ø3BA HAVSPA:     JSR     EDTIN   ;READ KEYTAB INTO TABLE
Ø343 96 19Z      LDAA    KEYZON  ;GET TIME ZONE FROM DIPLAY
Ø345 97 39Z      STAA    EDTZON  ;PUT IT IN EDTZON
              ; HERE TO FLASH THE DISPLAY OFF
Ø351 Ø9          DEX
Ø352 26 F9 =     BNE     FLASH
Ø354 7C ØØ1E     INC     POISON
Ø357 7E Ø3CC     JMP     EDTOUT  ;RESTORE DISPLAY AND RETURN
              ;
Ø35A BD ØØ26 OVERFL:     JSR     BLANK   ;BLANK DISPLAY
Ø35D 7F ØØ19     CLR     KEYZON  ;ZERO THE DISPLAY TIME ZONE
Ø36Ø 7C ØØ1E     INC     POISON
```

```
0363 39          RTS
                ;
0364 7F 0039 INSFAI:     CLR     EDTZON  ;IIIEGAI ENTRY
0367 7F 0019    CLR      KEYZON  ;ZAP TIME ZONE IN DISPLAY
036A 39          RTS
                ;
                ;  UP
                ;
                ;  UP MOVES EDTPTR UP TO THE PREVIOUS ENTRY.
                ;  IF THE POINTER IS AIREADY AT THE FIRST ENTRY
                ;  OF THE TABLE IT IS NOT MOVED.
                ;
036B DE 37Z  UP:         LDX     EDTPTR  ;GET CURRENT ENTRY
036D 8C 0227    CPX      #CMCS   ;ARE WE AT THE FIRST ENTRY
0370 27 0C =    BEQ      RETUP   ;IF SO THE RETURN
0372 BD 03E2    JSR      DEX3    ;ELSE DECREMENT X BY 3
0375 DF 37Z     STX      EDTPTR  ;EDTPTR = EDTPTR - 6
0377 BD 03CC    JSR      EDTOUT  ;PUT ENTRY INTO DISPLAY
037A 96 19Z     LDAA     KEYZON  ;GET TIME ZONE
037C 97 39Z     STAA     EDTZON  ;LEAVE IN EDTZON
037E 39       RETUP:     RTS
                ;  DOWN
                ;
                ;  DOWN MOVES EDTPTR DOWN BY ONE ENTRY. IF EDTPTR IS
                ;  AIREADY THE LAST ELEMENT OF THE TABLE DO NOTHING.
                ;
037F DE 37Z  DOWN:       LDX     EDTPTR  ;GET EDIT POINTER
0381 BC 0025    CPX      ENDPTR  ;PAST LAST ENTRY?
0384 27 16 =    BEQ      RETDWN  ;GO AWAY
0386 7D 0039    TST      EDTZON  ;IS CURRENT ENTRY LEGAL
0389 27 03 =    BEQ      ZERZON  ;USE THIS ENTRY
038B BD 03DE    JSR      INX3    ;GO TO NEXT ENTRY
038E BC 0025 ZERZON:     CPX     ENDPTR  ;PAST LAST ENTRY NOW?
```

```
0391 27 09 =      BEQ      RETDWN  ;GO AWAY

0393 DF 37Z       STX      EDTPTR  ;SAVE AS EDTPTR
0395 BD 03CC      JSR      EDTOUT  ;PUT OUT ENTRY ON DISPLAY
0398 96 19Z       LDAA     KEYZON  ;GET TIME ZONE OF DISPLAY

039A 97 39Z       STAA     EDTZON  ;PUT IT IN EDIT ZONE
039C 39        RETDWN:     RTS
               ;  CLRALL
               ;
               ;  CLRALL CLEARS THE ENTIRE TABLE OF VALID IDS

               ;
039D 96 14Z    CLRALL:     LDAA     KEYTAB  ;GET FIRST BYTE OF DISPLAY
039F 9A 15Z       ORAA     KEYTAB+1        ;OR IN SECOND BYTE
03A1 9A 16Z       ORAA     KEYTAB+2
03A3 9A 17Z       ORAA     KEYTAB+3
03A5 9A 18Z       ORAA     KEYTAB+4
03A7 9A 19Z       ORAA     KEYZON
03A9 26 0E =      BNE      CLRRET  ;IF DISPLAY NOT ALL ZERO GO AWAY
03AB BD 022E      JSR      BLANK   ;BLANK DISPLAY
               ;
03AE CE 0007 DOCLR:       LDX      #CMOS   ;GET START OF TABLE
03B1 FF 0005      STX      ENDPTR  ;MAKE IT END OF TABLE
03B4 DF 37Z       STX      EDTPTR  ;ALSO CURRENT ENTRY
03B6 7F 0039      CLR      EDTZON  ;THIS ENTRY ILLEGAL
03B9 39        CLRRET:     RTS
               ;  EDTIN
               ;
               ;  EDTIN READS THE DISPLAY IN KEYTAB INTO THE ENTRY
               ;  POINTED TO BY EDTPTR.
               ;
03BA BD 0271 EDTIN:       JSR      PKDIG   ;PACK THE DIGITS INTO DISDIG
03BD DE 37Z       LDX      EDTPTR  ;GET POINTER TO ENTRY
03BF 96 34Z       LDAA     DISDIG  ;GRAB FIRST BYTE OF DISDIG
```

```
23C1 A7 ØØ          STAA    Ø,X       ;PUT IT INTO TABLE
23C3 96 35Z         LDAA    DISDIG+1
23C5 A7 Ø1          STAA    1,X
23C7 96 36Z         LDAA    DISDIG+2
23C9 A7 Ø2          STAA    2,X
23CB 39             RTS
              ;
              ;
              ;  EDTOUT
              ;
              ;  EDTOUT PUTS THE ENTRY POINTED TO BY EDTPTR
              ;  OUT ONTO THE DISPLAY.
              ;
23CC DE 37Z   EDTOUT:   LDX      EDTPTR  ;GET POINTER TO ENTRY
23CE A6 ØØ          LDAA    Ø,X       ;GET FIRST BYTE OF ENTRY
23DØ 97 34Z         STAA    DISDIG  ;PUT IT INTO FIRST BYTE OF DISDIG
23D2 A6 Ø1          LDAA    1,X
23D4 97 35Z         STAA    DISDIG+1
23D6 A6 Ø2          LDAA    2,X
23D8 97 36Z         STAA    DISDIG+2
23DA BD 228D        JSR     UPKDIG  ;UNPACK DISDIG INTO THE DISPLAY
23DD 39             RTS
              ;  USEFUL ROUTINES
              ;
23DE Ø8       INX3:     INX
23DF Ø8       INX2:     INX
23EØ Ø8             INX
23E1 39             RTS
              ;
23E2 Ø9       DEX3:     DEX
23E3 Ø9       DEX2:     DEX
23E4 Ø9             DEX
23E5 39             RTS
```

```
03E6 48      ASLA4:    ASLA
03E7 48      ASLA3:    ASLA
03E8 48      ASLA2:    ASLA
03E9 48         ASLA
03EA 39         RTS
             ;
03EB 44      LSRA4:    LSRA
03EC 44      LSRA3:    LSRA
03ED 44      LSRA2:    LSRA
03EE 44         LSRA
03EF 39         RTS
             ;  DOSUM
             ;
             ;  DOSUM RETURNS THE CHECK SUM OF CMOS MEMORY FROM
             ;  LOCATION #SUM+2 TO LOCATION ENDMEM IN ACCS A AND B
             ;****************
03F0 CE 0002 DOSUM:     LDX     #SUM+2  ;FIRST ADDRESS FOR CHECK SUM

03F3 4F         CLRA
03F4 5F         CLRB
03F5 EB 00   LOOP1:     ADDB    0,X      ;ADD BYTE TO B
03F7 99 00      ADCA    0       ;ADD CARRY OUT TO A
03F9 08         INX             ;GO TO NEXT BYTE
03FA 9C 32Z     CPX     ENDMEM ;PAST END OF MEMORY?
03FC 26 F7 =    BNE     LOOP1
             ;
03FE 43         COMA            ;COMPLEMENT RESULT
03FF 53         COMB
0400 39         RTS
             ;  CHKSUM
             ;
             ;  CHKSUM COMPARES THE CHECK SUM OF MEMORY TO THE
             ;  VAULES STORED IN LOCATIONS SUM AND SUM + 1. IF
             ;  THE SUM IS DIFFERENT CARRY IS SET TO 1 ELSE
```

```
               ;  CARRY IS ZERO.
               ;
0401 BD 03F0 CHKSUM:   JSR     DOSUM   ;GET CHKSUM OF CMOS MEMORY
0404 B1 0020    CMPA   SUM     ;CHECK FIRST BYTE
0407 26 07 =    BNE    CHKERR  ;TOO BAD
0409 F1 0021    CMPB   SUM+1   ;SECOND BYTE
040C 26 02 =    BNE    CHKERR
040E 0C         CLC            ;CARRY = 0 MEANS OK
040F 39         RTS
               ;
0410 0D        CHKERR:   SEC           ;CARRY = 1 MEANS FAIL
0411 39         RTS
               ;
               ;  SETSUM
               ;
               ;  SETSUM PUTS THE CHECK SUM OF MEMORY INTO
               ;  LOCATIONS SUM AND SUM + 1
               ;
0412 BD 03F0 SETSUM:   JSR     DOSUM   ;GET CHECK SUM OF MEMORY
0415 B7 0020    STAA   SUM     ;STORE FIRST BYTE
0418 F7 0021    STAB   SUM+1   ;SECOND TOO
041B 39         RTS
               ; ROUTINE TO SEE IF SYS CODE IN DIGTAB IS OK
               ; RETURNS Z=1 IF OK
      041CF CHKSYS    =       *
041C 96 C5      LDAA   S.SYS
041E 84 0F      ANDA   #$0F
0420 91 30      CMPA   DIGTAB+6
0422 26 08 =    BNE    SYSRET  ;BAD NEWS
               ; NOW FOR HIGHER DIGIT
0424 96 C5      LDAA   S.SYS
0426 44         LSRA
0427 44         LSRA
```

```
0428 44          LSRA
0429 44          LSRA
042A 91 2FZ      CMPA    DIGTAB+5
042C 39       SYSRET:    RTS
              ; FRTL CHECKS TO SEE IF THIS CARD IS THE SAME
              ; AS THE LAST ONE.  IF IT IS NOT (AND IT HAS A VALID
              ; SYSTEM CODE) THEN WE STORE THIS AS THE NEW
              ; COMPARAND AND CLEAR THE COUNT OF ERROR TRIES
              ;*
      042DP FRTL         =        *
042D BD 041C     JSR     CHKSYS
0430 26 0C =     BNE     FRTS     ;BAD SYS CODE
              ;
0432 CE 0005     LDX     #$0005   ;FIVE DIGS IN RTLBUF
0435 A6 29Z  FRTLL:      LDAA     DIGTAB-1,X
0437 A1 39Z      CMPA    RTLBUF-1,X
0439 26 04 =     BNE     NEWFRT
043B 09          DEX

0432 CE 0005     LDX     #$0005   ;FIVE DIGS IN RTLBUF
0435 A6 29Z  FRTLL:      LDAA     DIGTAB-1,X
0437 A1 39Z      CMPA    RTLBUF-1,X

043C 26 F7 =     BNE     FRTLL
              ; IT WAS THE SAME
043E 39       FRTS:      RTS
              ;

043F A6 29Z  NEWFRT:     LDAA     DIGTAB-1,X
0441 A7 39Z      STAA    RTLBUF-1,X
0443 09          DEX
0444 26 F9 =     BNE     NEWFRT
              ;
0446 7F 003F     CLR     NTRIES
0449 39          RTS
```

```
                ; ROUTINE TO CHECK DURESS FLAG
                ; TRIGGERS RELAY IF SET
        244AP DURESS        =       *
244A 96 81          LDAA    EPROM+1
244C 84 20          ANDA    #C.DUR
244E 27 0E =        BEQ     NODUR   ;HE DIDN'T BUY THE DURESS OPTION
                ;
2450 96 107         LDAA    DURESF
2452 27 0A =        BEQ     NODUR   ;HE DIDN'T COMPLAIN
                ;
2454 86 40          LDAA    #B.DUR
2456 CE FC7C        LDX     #T.03S
2459 DF 20Z         STX     DUCNTR
245E 39         NODUR:      RTS
                ;  ROUTINE TO CHECK IDEK PASSWORD
                ;  RETURNS WITH CARRY = 1 IF OK
                ;  CARRY = 0 IF BAD
                ;
                ;  CALLS MIX TO RECALCULATE COMBINATION FUNCTION
                ;  ASSUMES CARD IMAGE IN DIGTAB
                ;  AND PASSWORD IN KEYTAB
                ;
                ;  MIXPTR IS A CALCULATED INDEX INTO DIGTAB
                ;  COMBX IS AN INDEX INTO MASTER
                ;  WE PROCESS THE DIGITS OF THE PASSWORD IN ORDER
                ;
        245FP COMBIN        =       *
245F BD 0482        JSR     MIX     ;TABLE OF DIGIT INDICES IN 'MASTER'
2462 7F 024A        CLR     MIXPTR  ;MSB OF XREG
2465 CE 0000        LDX     #0      ;FIRST DIGIT OF PASSWORD
2468 A6 21Z     COMBI:      LDAA    MASTER,X
246A DF 4BZ         STX     COMBX
246C 97 4BZ         STAA    MIXPTR+1
```

```
246E DE 4AZ      LDX     MIXPTR
                 ; NOW X INDICATES WHICH DIGIT OF HIS
                 ; CARD FORMS THIS DIGIT OF THE PASSWORD
2470 A6 2AZ      LDAA    DIGTAB,X
2472 DE 48Z      LDX     COMEX
2474 A1 14Z      CMPA    KEYTAB,X
2476 26 08 =     BNE     COMBAD
2478 08          INX
2479 8C 0003     CPX     #3
247C 26 EA =     BNE     COMB1
247E 0D          SEC
247F 39          RTS
                 ;
2480 0C          COMBAD:    CLC
2481 39          RTS
                 ; SUBROUTINE TO PREPARE COMPARAND
                 ; TABLE FOR IDEK PERSONAL CODE
                 ; THE IDEK CODE IS 4 DIGITS TAKEN FROM THE CARDHOLDER'S
                 ; 5 DIGIT CODE IN AN ARBITRARY ORDER
                 ;
                 ; SO WE HAVE ALL COMBINATIONS OF FIVE THINGS
                 ; TAKEN FOUR AT A TIME
                 ; >>>120<<<
                 ; SPECIFY WHICH OF THE FIVE IS MISSING (3 BITS)
                 ; >>>24<<<
                 ; SPECIFY WHICH OF THE FOUR APPEARS FIRST (2 BITS)
                 ; >>>6<<<
                 ; SPECIFY WHICH COMES NEXT (2 BITS)
                 ; >>>2<<<
                 ; TAKE THE REMAINING TWO IN ORDER, OR REVERSED (1 BIT)
                 ;
                 ; BIT MEANINGS:
```

```
        ; THE PERM/COMB SWITCH HAS FOUR FIELDS,
        ; IN THIS FORM:    (MMMFFSSX)
        ; WHERE MMM INDICATES WHICH IS MISSING
        ; FF...WHICH COMES FIRST
        ; SS...WHICH COMES SECOND
        ; X...=1 IF LAST SHOULD BE FLIPPED
        ; RTC
        ;
        ;*************************************************
        ;
        ; ALL TASKS WHICH REQUIRE TIME DELAYS AND ALL
        ; PARAMETERS REQUIRING CONTINUOUS MONITORING
        ; ARE HANDLED BY THIS SET OF ROUTINES.
        ; SPECIFICALLY, THIS MODULE HANDLES THE
        ; FOLLOWING TASKS:
        ;
        ; DOOR OPEN PUSHBUTTON MONITORING
        ; RELAY ACTIVATION SEQUENCES
        ; RELAY CLOSURES AFTER TIME DELAY
        ; DEAD MAN SET
        ; CARD EDGE DETECT
          TITLE   'RTC'
        ;
        ; DEFINE MODULE STARTING ADDRESS
        ;
0000      PSECT
        ;
0000 7E 000C   JMP   RTC
0003 7E 0014   JMP   OPEN
0006 7E 01F5   JMP   BLANK
0009 7E 015B   JMP   RLYON
        ; RTC
        ; THIS IS THE MAIN SERVICE ROUTINE FOR THE REAL
```

```
                ; TIME CLOCK INTERRUPTS.  A RISING EDGE OF THE CLOCK
                ; FORCES AN IRQ INTERRUPT WHICH VECTORS TO RTC.
                ; RTC IN TURN CALLS SUBROUTINES TO EXECUTE THE
                ; VARIOUS TASKS THAT NEED SERVICING ONE AT A TIME.
                ;
                ;
     000CP RTC        =        *

000C 96 4F2      LDAA     VAREND
000E 26 FE =     BNE      *                ;STACK OVERFLOW????
                ;
0010 96 A6       LDAA     BUFB     ;CLR INTERRUPT AT PIA
0012 86 38       LDAA     #$38     ;RESET PIA DDR'S
0014 97 A5       STAA     CSRA
0016 86 0A       LDAA     #$0A
0018 97 A7       STAA     CSRB
001A 86 FF       LDAA     #$FF
001C 97 A4       STAA     BUFA
001E 86 FE       LDAA     #$FE
0020 97 A6       STAA     BUFB
0022 86 3C       LDAA     #$3C     ;SET DEAD MAN HIGH
0024 97 A5       STAA     CSRA
0026 86 2E       LDAA     #$2E
0028 97 A7       STAA     CSRB
002A BD 0174     JSR      KEYSER   ;SCAN KEYBD
002D BD 023A     JSR      CRDEDG   ;CHK FOR CRD IN
0030 BD 0069     JSR      MUX      ;TEND THE DISPLAY IF NEEDED
0033 BD 0090     JSR      APP      ;CHK DOOR OPEN PUSHBUTTON
0036 BD 00B1     JSR      CNTDN    ;COUNT DOWN SERVICE TIMERS
                ;
0039 3B          RTI               ;RETURN TO BACKGROUND TASK
                ; CRDEDG
                ; CHECKS FOR CARD, SETS CRDFIG ACCORDINGLY
                ; 00       NO CARD
```

```
                ;  NN       (1<NN<=20) CARD IN, BUT BOUNCING
                ;  01       CARD IN, NOT YET PROCESSED
                ;  FE       CARD IN, ALREADY PROCESSED
                ;
      023AP CRDEDG      =        *
023A 96 122     LDAA      EDMODE  ;ARE WE EDITING?
023C 26 2A =    BNE       CRDDN   ;YES; IGNORE CARDS
023E 96 112     LDAA      CRDFLG
0240 26 11 =    BNE WASIN
                ; HERE IF THE CARD WAS NOT IN LAST TIME
0242 96 A6      LDAA      BUFB
0244 84 01      ANDA      #$01
0246 27 20 =    BEQ       CRDDN
0248 86 20      LDAA      #$20
024A 97 112     STAA      CRDFLG  ;PUT DEBOUNCE CNT INTO CRDFLG
                ;
024C 7F 001B    CLR       KEYCNT  ;IDEK ENTRY START OVER
024F 7F 001C    CLR       DURESF  ;DURESS MUST BE AFTER CARD IN
0252 39         RTS
0253 96 A6    WASIN:      LDAA     BUFB    ;FLAG CARD REMOVAL
0255 84 01      ANDA      #$01
0257 27 0C =    BEQ       CRDCLR  ;CARD REMOVED
                ; HERE IF CARD STILL IN
0259 96 112     LDAA      CRDFLG
025B 81 FE      CMPA      #$FE            ;CARD PROCESSED?
025D 27 09 =    BEQ       CRDDN           ;YES; DO NOT DEBOUNCE
025F 4A         DECA              ;CHECK DEBOUNCE COUNT
0260 27 06 =    BEQ       CRDDN   ;COUNT WAS 1, I.E. STOPPED
0262 97 112     STAA      CRDFLG
0264 39         RTS
                ;
      0265P CRDCLR      =        *
0265 7F 0011    CLR       CRDFLG
```

```
0268 39        CRDDN:     RTS
               ; EDITOR DISPLAY MULTIPLEXER
               ; CALL HERE ONCE A TICK TO CHANGE THE DISPLAY
               ; THIS ROUTINE IS HIGHLY NON-REENTRANT
               ; INDEED, IT OUTPUTS A DIFFERENT DIGIT EACH
               ; TIME IT IS CALLED.
               ;
       0269P MUX        =      *
0269 96 12Z        LDAA    EDMODE  ;SHOULD THE DISPLAY BE LIT?
026B 27 FB =       BEQ     CRDDN   ;;NO
026D 96 4DZ        LDAA    MUXPTP+1
026F 48            ASLA
0270 97 4EZ        STAA    MUXTMP
0272 D6 A6         LDAB    BUFB
0274 C4 F1         ANDB    #$F1
0276 DA 4EZ        ORAB    MUXTMP
               ; B CONTAINS DIGIT#
               ; NOW GET DATA FOR THIS DIGIT
0278 96 A4         LDAA    BUFA
027A 84 F0         ANDA    #$F0
027C DE 4CZ        LDX     MUXPTR
027E AA 14Z        ORAA    KEYTAB,X
0280 97 A4         STAA    BUFA
0282 D7 A6         STAB    BUFB
               ;
0284 09            DEX
0285 8C 0000       CPX     #0      ;DEX DOESN'T SET FLAGS NICELY!
0288 2A 03 =       BPL     *+5
028A CE 0005       LDX     #$0005
028D DF 4CZ        STX     MUXPTR
028F 39            RTS
               ; APB
               ; CHECKS DOOR OPEN PUSHBUTTON.    CAUSES DOOR OPEN
```

```
              ; SEQUENCE WHEN CLOSURE IS DETECTED IF PUSHER'S
              ; FINGER HAS RIGHT SYSTEM CODE
              ;
0290 96 30    APB:      LDAA   FPROM   ;CHK FOR AS OPTION
0292 84 20       ANDA   #O.AS
0294 27 1A =     BEQ    APBD
              ;
0296 96 10       LDAA   APBFLG  ;IGNORE SWITCH IF
0298 26 0D =     BNE    APX     ;ALREADY SERVICED
              ;
029A 96 C3       LDAA   S.XXX   ;OPEN DOOR IF SWITCH
029C 84 80       ANDA   #X.AS   ;IS PUSHED
029E 26 10 =     BNE    APBD
02A0 BD 00F4     JSR    OPEN
02A3 7C 0010     INC    APBFLG  ;FLAG AS SERVICED
02A6 39          RTS
              ;
02A7 96 C3    APX:      LDAA   S.XXX   ;CLR FLAG WHEN SWITCH
02A9 84 80       ANDA   #X.AS   ;IS RELEASED
02AB 27 03 =     BEQ    APBD
02AD 7F 0010     CLR    APBFLG
              ;
02B0 39       APBD:     RTS
              ; CNTDN
              ;
              ; EVERY TASK INVOLVING A TIME DELAY HAS A
              ; COUNTER ASSOCIATED WITH IT. THESE TWO BYTE
              ; COUNTERS ARE LOADED WITH A NUMBER TO ACTIVATE
              ; THEM. EACH COUNTER THEN INCREMENTS ON EACH
              ; CLOCK TICK UNTIL IT OVERFLOWS, AT WHICH TIME
              ; A COMPLETION ROUTINE IS CALLED TO TAKE THE
              ; APPROPRIATE ACTION.
              ; YOU SHOULD ALSO BE AWARE THAT EACH
```

```
              ; COMPLETION ROUTINE IS CALLED WITH A VALUE IN AC A
              ; EQUAL TO 2^N WHERE N IS THE VECTOR SLOT NUMBER
              ; OF THAT ROUTINE.

              ; THIS MAKES FOR SIMPLIFIED RLYOFF CALLS
              ;
00B1 CE 0000 CNTDN:    LDX     #$0000  ;SET LOOP INDICES
00B4 86 01      LDAA    #$01
              ;
00B6 6D 00Z  CNTDN1: TST       CNTRS,X ;CLOCK EACH COUNTER
00B8 27 1D =    BEQ     CNTDNS  ;UNLESS ITS ALREADY
00BA 6C 01Z     INC     CNTRS+1,X      ;ZERO
00BC 26 19 =    BNE     CNTDNS
00BE 6C 00Z     INC     CNTRS,X
00C0 26 15 =    BNE     CNTDNS
00C2 36         PSHA
00C3 DF 40Z     STX     XREG0   ;IF COUNTER OVERFLOWS
00C5 86 ??      LDAA    #MSB SERV      ;TO ZERO, CALL ASSOCIATED
00C7 97 40Z     STAA    XREG0   ;SERVICE ROUTINE
00C9 DE 40Z     LDX     XREG0
00CB EE ??      LDX     LSB SERV,X
00CD 32         PULA
00CE 36         PSHA
00CF AD 00      JSR     0,X
00D1 4F         CLRA
00D2 97 40Z     STAA    XREG0
00D4 DE 40Z     LDX     XREG0
00D6 32         PULA
             ;
00D7 08      CNTDNS: INX                         ;INCREMENT LOOP INDICE
00D8 08         INX                   ;LOOP UNTIL ALL CNTRS SERVICED
00D9 48         ASLA            ; SHIFT BIT TO NEXT PLACE
00DA 8C 0010    CPX     #NCNTRS
00DD 26 D7 =    BNE     CNTDN1
```

```
          ; SERVICE TABLE
          ;
     00E0P SERV     =        *
00E0          WORD   GOON
00E2          WORD   GOOFF
00E4          WORD   GXOFF
00E6          WORD   EDEND
00E8          WORD   RLYOFF  ;ERCFF
00EA          WORD   RLYOFF  ;ASOFF
00EC          WORD   RLYOFF  ;DUOFF
00EE          WORD   RTS3    ;FOR PATCHING
          ; THIS ROUTINE IS CALLED WHEN
          ; THE EDITOR HAS DONE NOTHING FOR A WHOLE MINUTE
          ; SO WE LEAVE EDIT MODE
          ;
     00F0P EDEND    =        *
00F0 7F 0012   CLR    EDMODE
00F3 39        RTS
          ;
          ; OPEN

          ;
          ;
          ; STARTS DOOR OPEN SEQUENCE.
          ; TURNS ON ALARM SHUNT, WAKES UP GOON TO TURN
          ; ON GO RELAY AFTER 50 MILLISECOND DELAY.
          ;
00F4 96 02   OPEN:     LDAA   EPROM   ;CHECK 'AS' OPTION,LEAVE
00F6 84 20      ANDA   #O.AS   ;RELAY OFF UNLESS IN
00F8 27 05 =    BEQ    OPENS
          ;
00FA 86 20      LDAA   #R.AS   ;TURN ON 'AS' RELAY
00FC BD 015B    JSR    RLYON
00FF BD 014B OPENS:    JSR    NOTIME  ;TURN OFF CONFLICTING TIMERS
```

```
0102 CE FF50    LDX      #T.50MS ;WAKE UP SOON IN 50 MS
0105 DF 00Z     STX      OFCNTR
             ;
0107 39      OFEND:     RTS
       0107P RTS3          =        OFEND
             ;  GOON
             ;
             ;  TURN ON GO RELAY
             ;  ENABLE EITHER GOOFF OR GXOFF TO
             ;  TURN IT OFF LATER
             ;
             ;  "COME IN, TAILOR. HERE YOU MAY ROAST YOUR GOOSE.
             ;
             ;
0108 86 80   GOON:      LDAA    #R.GO   ;ACTIVATE RELAY
010A BD 015B    JSR      RLYON
             ;
010D CE 0002    LDX      #GOCNTR ;SET DELAY ACORDING
0110 96 C6      LDAA     S.VTD   ;TO VTD SWITCHES IF
0112 84 0F      ANDA     #$0F    ;VTD NOT ZERO
0114 27 04 =    BEQ      GOONX
0116 BD 0150    JSR      CALCT
0119 39         RTS
             ;
011A 86 FF   GOONX:     LDAA    #$FF    ;WHEN VTD IS ZERO,
011C 97 04Z     STAA     GXCNTR  ;ENABLE ROUTINE TO
011E 97 05Z     STAA     GXCNTR+1 ;CLOSE GO RELAY AS SOON
             ;                  ;AS CARD IS REMOVED
0120 39      GOEND:     RTS
             ;  GOOFF
             ;
             ; "I PRAY YOU, REMEMBER THE PORTER"
             ; WHEN 'GO' RELAY TIMES OUT, WE MUST KEEP
```

```
            ; THE AS RELAY CLOSED AWHILE LONGER

            ; TIME SPECIFIED BY THE AS/DOD SWITCHES

            ;

0121 86 80  GOOFF:    LDAA    #R.GO
0123 BD 0155    JSR     RLYOFF  ;CLOSE 'GO' RELAY

            ;

0126 96 C6      LDAA    S.AS            ;READ AS/DOD SWITCHES
0128 44         LSRA
0129 44         LSRA
012A 44         LSRA
012B 44         LSRA
012C 4C         INCA    ;AS=0 MEANS SHORTEST TIME
012D 48         ASLA

            ;

            ;  AT THIS POINT, AC CONTAINS 000XXXX0

            ;

012E CE 000A    LDX     #ASCNTR ;LOAD 'AS' COUNTER
0131 BD 0160    JSR     CALCT   ;ACCORDING TO SWITCHES

            ;

0134 39         RTS

             ;  GXOFF

             ;

             ;

             ;  CHECKS IF CARD STILL IN SLOT.

             ;  IF NOT, DISABLES GO IMMEDIATELY

             ;  IF SO, WAKES ITSELF UP ON NEXT CLOCK.

             ;

             ;  "I'LL DEVIL PORTER IT NO LONGER"

             ;

             ;

       0135P GXOFF      =       *
 0135 96 A6      LDAA    BUFB    ;CHECK FOR CARD
```

```
Ø137 84 Ø1        ANDA    #Ø1
Ø139 26 Ø9 =      BNE     STILL
              ; KEEP IT ON IF A.S. BUTTON IS PUSHED
Ø13B 96 C3        LDAA    S.XXX
Ø13D 84 8Ø        ANDA    #X.AS
Ø13F 27 Ø3 =      BEQ     STILL
              ; GO CLOSE GO AND THEN AS RELAYS
Ø141 7E Ø121      JMP     GOOFF
              ; HERE IF WE WANT TO STAY OPEN
Ø144 86 FF    STILL:      LDAA    #$FF    ;WAKE ME UP AT
Ø146 97 Ø4Z       STAA    GXCNTR  ;NEXT CLOCK TICK
Ø148 97 Ø5Z       STAA    GXCNTR+1
              ;
Ø14A 39       GXD:        RTS
              ; NOTIME TURNS OFF A WHOLE SLEW OF COUNTERS
              ; CALL HERE WHEN YOU START A 'GO SEQUENCE'
              ; SO THAT YOUR PREDECESSORS CANNOT INTERFERE WITH YOU
              ;
Ø14B CE ØØØØ NOTIME: LDX          #Ø
Ø14E DF ØAZ       STX     ASCNTR
Ø15Ø DF Ø2Z       STX     GOCNTR
Ø152 DF Ø2Z       STX     OPCNTR
Ø154 39           RTS
              ;
              ;  RLYOFF
              ;
              ;
              ; RLYOFF CLOSES THE RELAY INDICATED
              ; BY MASK (E.G. $8Ø) IN AC A
              ;
              ;
      Ø155P RLYOFF      =         *
Ø155 43           COMA
```

```
0156 94 A6      ANDA    BUFB
0158 97 A6      STAA    BUFB
            ;
015A 39         RTS
            ;
            ;
            ;  RLYON    ;TURNS ON A RELAY
            ;           ;BIT MASK E.G. $02 IN AC A
            ;
      015BB RLYON       =       *
015B 9A A6      ORAA    BUFB
015D 97 A6      STAA    BUFB
            ;  CALCT
            ;

            ;
            ;
            ;  CALCULATE TIMER CONSTANT FROM VALUE
            ;  IN ACCUM A. ACCUM A CONTAINS TIME IN SECONDS,
            ;  X POINTS TO TIMER.
            ;
            ;
0160 6F 00  CALCT:      CLR     0,X     ;ACCUMULATE TIMER CONST.
0162 6F 01      CLR     1,X     ;IN XREG2
            ;
            ;
0164 E6 01  CALCTL: LDAB        1,X     ;SUBTRACT ONE SECOND
0166 C2 2C      SUBB    #LSB (-T.21S) ;EACH TIME THRU LOOP
0168 E7 01      STAB    1,X
016A E6 00      LDAB    0,X
016C C2 01      SBCB    #MSB (-T.01S)   ;MSB
016E E7 00      STAB    0,X
            ;
0170 4A         DECA            ;GO THRU LOOP UNTIL
```

```
2171 26 F1 =     BNE     CALCTI  ;ACCUM A COUNTED OUT
              ;
              ;
2173 39          RTS             ;RETURN WITH TIMER
              ;                  ;CONST. IN X
              ;  KEYSER
              ;
              ;
              ;  MAIN KEYBOARD SERVICE ENTRY,
              ;  CALL HERE AT RTC TO CHECK KEYBOARD
              ;  CONTINUALLY SHOVES NEW KEYS INTO KEYTAB
              ;  CALLS DEBOUNCE AND STASH ETC..
              ;
              ;
        2174P KEYSER     =       *
2174 BD 217E     JSR     DB      ;WHAT HAS BEEN PUSHED?
2177 4D          TSTA            ;FF MEANS NOTHING
2178 2B 03 =     BMI     NOKEY
217A BD 2139     JSR     STASH   ;PUT INTO MEMORY
              ;
217D 39       NOKEY:    RTS
              ;  DEBOUNCE
              ;
              ; RETURNS # OF KEY IN AC A
              ; RETURNS FF IF NO NEW KEYS THIS TIME
              ;
              ; USES SUBR KEYSCAN
              ;
        217EP DB =      *
217E BD 01D4     JSR     KEYSCN  ;GET NEW KEY IN B
2181 96 22Z      LDAA    OLDKEY
2183 D7 20Z      STAB    OLDKEY          ;SAVE THIS # FOR NEXT TIME
              ;                  ;A CONTAINS ONLY COPY OF OLD ONE
```

```
2185 11           CBA
2186 27 06 =      BEQ     OLDIE
            ; HERE IF WE SEE KEY FOR FIRST TIME
2188 7F 001F      CLR     KEYFLG
218B 86 FF        LDAA    #$FF              ;DON'T ASSIMILATE UNTIL LATER
218D 39           RTS

            ; HERE IF SEEN AT LEAST ONCE BEFORE
218E D6 1F  OLDIE:      LDAB    KEYFLG
2190 27 03 =      BEQ     GOODIE
            ; HERE IF SEEN MANY TIMES
2192 86 FF        LDAA    #$FF
2194 39           RTS
            ;
2195 7A 001F GOODIE: DEC      KEYFLG            ;NO LONGER VIRGIN
2198 39           RTS                       ;KEY # IN AC A STILL

            ;  STASH   ;PROCESS KEYBOARD CHARS
            ;
            ; IF A NUM, STORES IT INTO KEYTAB
            ; AND INCREMENTS KEYCNT
            ; IF DURESS, SETS DURESF FLAG
            ;
            ; CALLED WITH CHAR IN AC A
            ;
      0199P STASH      =        *
            ; FIRST FOR THE SPECIAL CHECKS
            ;
2199 81 0A        CMPA    #$0A              ;DURESS CHARACTER
219B 27 2E =      BEQ     DURKEY
219D 2A 2F =      BPL     CMDKEY  ;10 AND UP ARE CMDS
            ; HERE IF IT IS A PLAIN NUMBER

219F 7D 001E      TST     POISON
21A2 27 03 =      BEQ     *-5
```

```
01A4 BD 01B5    JSR      BLANK    ;FIRST CHAR AFTER CMD CLEARS DISPLAY
              ; SEE IF THERE IS ROOM
01A7 D6 1BZ      LDAB     KEYCNT
01A9 C1 06       CMPB     #$06
01AB 27 07 =     BEQ      RTS4     ;DISPLAY ALREADY FULL
              ; OK, STICK IT IN
01AD 5C          INCB
01AE D7 1BZ      STAB     KEYCNT
01B0 DE 1AZ      LDX      KEYPTR   ;WHICH IS KEYCNT-1
01B2 A7 13Z      STAA     KEYTAB-1,X
01B4 39         RTS4:     RTS
              ; HERE TO BLANK OUT THE WHOLE DISPLAY
              ; KRUMPS X AND B
       01B5P BLANK       =        *
01B5 D6 A6       LDAB     BUFB
01B7 CA 0E       ORAB     #$0E
01B9 D7 A6       STAB     BUFB
              ;
01BB CE 0F0F     LDX      #$0F0F
01BE DF 14Z      STX      KEYTAB
01C0 DF 16Z      STX      KEYTAB+2
01C2 DF 18Z      STX      KEYTAB+4
01C4 7F 001B     CLR      KEYCNT
01C7 7F 001E     CLR      POISON
01CA 39          RTS
              ;
       01CBP DURKEY      =        *
01CB 97 1CZ      STAA     DURESF          ;MAKE FLAG NON-ZERO
01CD 39          RTS
              ;
              ; HERE WHEN WE SEE A CMD KEY
01CE 97 1DZ   CMDKEY: STAA        CMDBYT
01D0 7C 001E     INC      POISON
```

```
21D3 39             RTS
                ;  KEYSCAN
                ;
                ; TELLS WHAT KEY IS DOWN
                ; ANSWER IS IN AC B
                ; 0 THROUGH $2A DESIGNATES KEY
                ; $10 THROUGH $1A DESIGNATES SHIFTED CONTROL KEY
                ; FF MEANS NO KEYS PUSHED
                ;
     01D4P KEYSCN     =        *

21D4 5F             CLRB              ;START WITH KEY 0
                ;
                ; DETERMINE WHAT ROW THE KEY IS IN
                ;
21D5 96 E0          LDAA    ROW0
21D7 43             COMA
21D8 84 F0          ANDA    #$F0    ;UNUSED BITS
21DA 26 15 =        BNE     GOTIT
21DC CB 04          ADDB    #4              ;NEXT ROW STARTS WITH KEY 4
                ;
21DE 96 E1          LDAA    ROW0+1
21E0 43             COMA
21E1 84 F0          ANDA    #$F0
21E3 26 0C =        BNE     GOTIT
21E5 CB 04          ADDB    #4
                ;
21E7 96 E2          LDAA    ROW0+2
21E9 43             COMA
                ;   ANDA    #$F0
21EA 84 70          ANDA    #$70            ;TRASH BIT FROM SHIFT KEY
21EC 26 03 =        BNE     GOTIT
                ; HERE IF NO ROWS HAVE KEYS DOWN
21EE C6 FF          LDAB    #$FF
```

```
01F0 39          RTS
            ;
            ; NOW TO DETERMINE WHICH OF THE FOUR COLUMNS IT IS
            ; AT THIS POINT, B CONTAINS 2, 4, OR 8
            ; AND A CONTAINS A 'ONE-OF-FOUR' CODE IN THE MSB'S
            ; THE CODE FOR KEY 0 IS 10; KEY 1 IS 20, ETC.
            ;
        01F1F GOTIT      =       *
01F1 44          LSRA
01F2 44          LSRA
01F3 44          LSRA
01F4 44          LSRA
            ; NOW CODE IS THE THE FOUR LSB'S
01F5 44      KEYSI:      LSRA                    ;PUT A BIT INTO CARRY
                           FLAG
01F6 25 03 =     BCS      DONKEY  ;IF A ONE, THEN WE'RE THROUGH
01F8 5C          INCB             ;NOPE...GO TO NEXT BIT
01F9 20 FA =     BRA      KEYSI   ;LOOP UNTIL FIND ONE
            ; NOTE THAT WE ARE GUARANTEED THAT AC IS NON-ZERO!!!
            ; HERE WITH NUMERIC IN AC B
            ; SEE IF SHIFT KEY IS PUSHED
01FB 7D 0082     TST      ROW0+2
01FE 2B 02 =     BMI      *+4            ;SKIP IF NOT PUSHED
0200 CA 10       ORAB     #$10    ;ADD IN SHIFT BIT
0202 39          RTS
```

What is claimed is:

1. A security access system, comprising:

a central processor, comprising:

a programmable memory storing data specifying personnel access at plural remote terminals; and means for communicating with said plural remote terminals; and plural remote terminals connected by said communicating means with said central processor, each comprising:

a programmable memory within said terminal storing data specifying personnel access for said remote terminal; and means within said terminal for providing selective, programmable access at a remote location in response to either said central processor memory data or said remote terminal memory data.

2. A security access system, as defined in claim 1, wherein said remote terminal additionally comprises:

means for programming said memory for storing different personnel access data in an ordered stack comprising:

means for deleting individual access data from said stack;

means for compressing said stack whenever said stack comprises memory locations from which access data has been deleted; and means for maintaining the order of said stack.

3. A security access system, as defined in claim 1, wherein said remote terminal additionally comprises:

means for storing data specifying times of day for access for said same personnel; and means for comparing said stored time of day data with real time to provide selective access.

4. A security access system, as defined in claim 3, wherein said means storing time of day access data is programmable.

5. A security access system, as defined in claim 4, wherein said comparing means comprises plural real-time clocks, each of which is independently setable to provide access at different times of day.

6. A security access system, as defined in claim 1, wherein said remote terminal means for providing access at a remote location in response to either said central processor memory data or said remote terminal memory data comprises means for determining the integrity of communication lines with said central processor and for providing access in response to said remote terminal memory data if said communication lines are faulty.

7. A security access system, as defined in claim 1, wherein said remote terminal additionally comprises:

keyboard means;

means connecting said keyboard means to program said memory; and means connected to said keyboard means and said memory for providing selective access at said remote location in response to data entered on said keyboard means by personnel requesting access.

8. A security access system, as defined in claim 7, wherein said data entered on said keyboard means for providing access is a predetermined permutation and combination of data stored in said memory.

* * * * *